US006023279A

United States Patent [19]
Sowizral et al.

[11] Patent Number: 6,023,279
[45] Date of Patent: Feb. 8, 2000

[54] METHOD AND APPARATUS FOR RAPIDLY RENDERING COMPUTER GENERATED IMAGES OF COMPLEX STRUCTURES

[75] Inventors: Henry A. Sowizral, Los Altos, Calif.; Karel Zikan, Seattle, Wash.

[73] Assignee: The Boeing Company, Seattle, Wash.

[21] Appl. No.: 08/781,104

[22] Filed: Jan. 9, 1997

[51] Int. Cl.[7] .................................................. G06T 15/40
[52] U.S. Cl. ........................................ 345/421; 345/506
[58] Field of Search .................................. 345/421, 422, 345/502, 505, 1, 506

[56] References Cited

U.S. PATENT DOCUMENTS

| | | | |
|---|---|---|---|
| 4,570,233 | 2/1986 | Yan et al. | ................................ 345/505 |
| 4,594,673 | 6/1986 | Holly . | |
| 4,865,423 | 9/1989 | Doi . | |
| 4,901,252 | 2/1990 | Fitzgerald et al. . | |
| 4,912,659 | 3/1990 | Liang . | |
| 4,918,626 | 4/1990 | Watkins et al. . | |
| 4,928,250 | 5/1990 | Greenberg et al. . | |
| 4,952,922 | 8/1990 | Griffin et al. . | |
| 4,982,180 | 1/1991 | Seki et al. . | |
| 5,088,054 | 2/1992 | Paris, II . | |
| 5,091,960 | 2/1992 | Butler . | |
| 5,125,074 | 6/1992 | Labeaute et al. . | |
| 5,299,298 | 3/1994 | Elmquist et al. . | |
| 5,305,430 | 4/1994 | Glassner . | |
| 5,313,568 | 5/1994 | Wallace et al. . | |
| 5,317,689 | 5/1994 | Nack et al. . | |
| 5,764,228 | 6/1998 | Baldwin | ................................ 345/344 |

OTHER PUBLICATIONS

McNeill, M.D.J, et al., "Performance of Space Subdivision Techniques in Ray Tracing" *Computer Graphics Forum*, 11(4):213–220, (1992).

Kay, T.L., Kajiya, J.T., *Ray Tracing Complex Scenes*, Computer Graphics (SIGGRAPH '86 Proceedings), Annual Conference Series, 269–278, Aug. 1986.

Schroeder, W.J., Zarge, J.A., Lorenson, W.E., *Decimination of Triangle Meshes*, Computer Graphics (SIGGRAPH '92 Proceedings), 26(2):65–70, Jul. 1992.

Hoppe, H., DeRose, T., Duchamp, T., McDonald, J., Stuetzle, W., *Mesh Optimization*, Computer Graphics (SIGGRAPH '93 Proceedings), Annual Conference Series, 19–26, Aug. 1993.

Funkhouser, T.A., Séquin C.H., *Adaptive Display Algorithm for Interactive Frame Rates During Visualization of Complex Virtual Environments*, Computer Graphics (SIGGRAPH '93 Proceedings), Annual Conference Series, 247–254, Aug. 1993.

Foley et al., "Computer Graphics: Principals and Practice", Addison–Wesley Publishing Company, pp. 701–714, 855–880, 1990.

*Primary Examiner*—Mark K. Zimmerman
*Attorney, Agent, or Firm*—Christensen O'Connor Johnson & Kindness PLLC

[57] ABSTRACT

The image rendering system (20) of the present invention rapidly renders graphical image of complex structures. A complex structure is represented by a plurality of objects that can be organized into an object hierarchy. The image rendering system (20) projects a plurality of rays (55) from a given vision coordinate. For each projected ray, the image rendering system (20) determines with which objects in the object hierarchy are intersected by the ray (55). The image rendering system (20) then determines which object among those intersected by the ray (55) is closest to the given vision coordinate and adds that object to a set of visible objects. As objects are added to the set of visible objects, each object is rendered on the display in accordance with a current vision coordinate. Since the process of adding objects to the set of visible objects is decoupled and run asynchronously from the process of rendering visible objects on the display, the image rendering system (20) is capable of rendering objects at real-time frame rates.

22 Claims, 21 Drawing Sheets

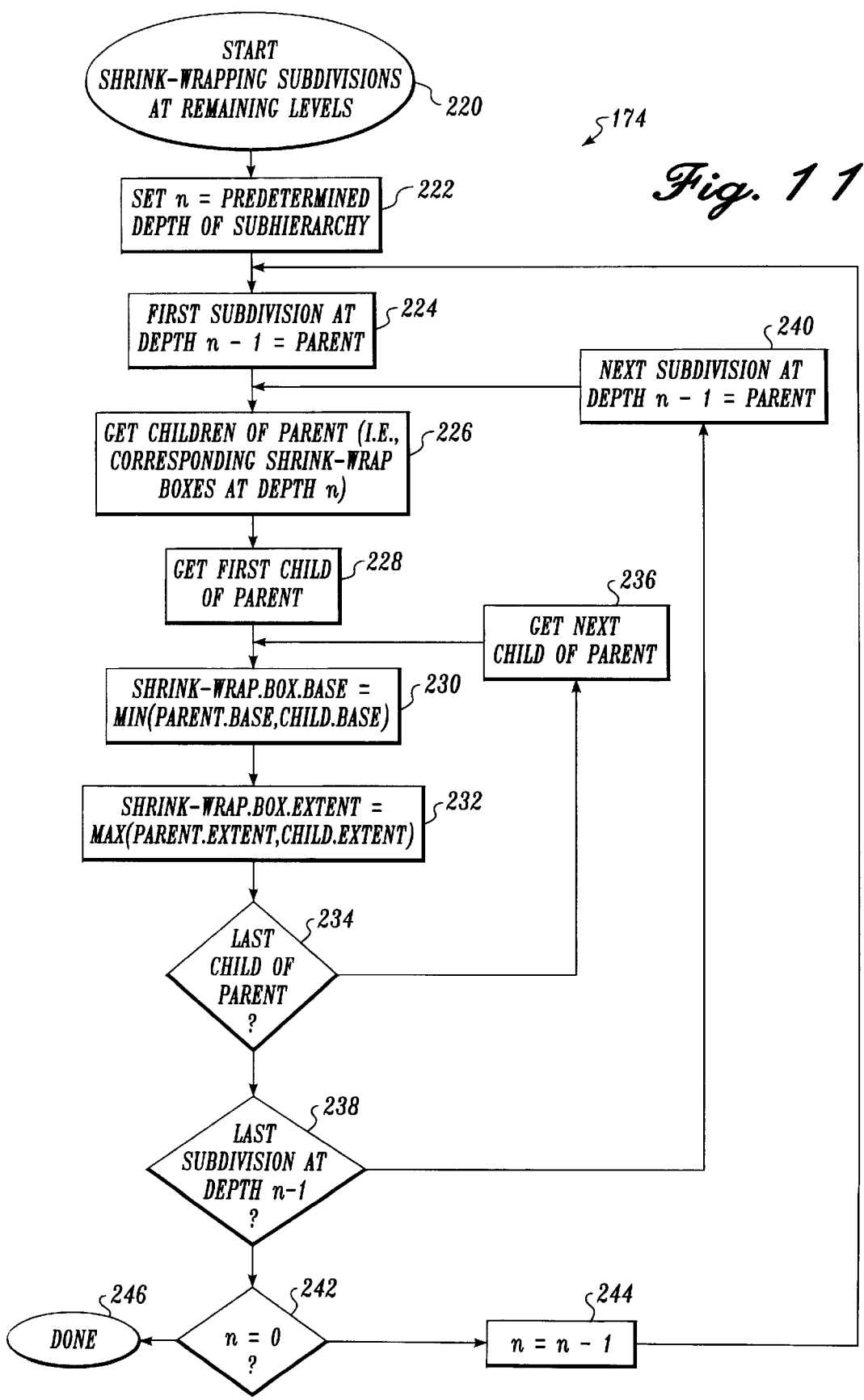

METHOD AND APPARATUS FOR RAPIDLY RENDERING COMPUTER GENERATED IMAGES OF COMPLEX STRUCTURES

FIELD OF THE INVENTION

This invention generally relates to a method and apparatus for computer image modeling of a complex structure, and more particularly, to a method and apparatus for rapidly rendering computer generated images of a complex structure on set of displays.

BACKGROUND OF THE INVENTION

Interactive computer generated displays provide for the visualization of realistic looking, three-dimensional models. Such models, under user control, are useful for both design evaluation and training and virtual environments, as may be found, for example, in mechanical computerized design systems. Such computer visualization systems provide images of a three-dimensional, complex structure on the screen of a computer workstation as seen from a simulated observer's viewpoint under interactive control by the user. If the computer generated display can be rendered smoothly and quickly enough, the user is provided an illusion of real-time exploration of a virtual environment under simulated observer movement through the structure.

A particular application for an interactive, computer generated visualization system of a complex structure is found in the modeling of highly complex structure, such as aircraft. A system which allows the user interactive movement throughout the structure can aid in numerous aspects related to the ultimate success of the product. For example, an interactive display of a complex aircraft structure can identify interference and fit problems, provide the ability to "see" areas of the product normally hidden in a physical mock-up, design routing of ducts and wiring through crowded areas, facilitate the work of integrated product teams by providing a "live" model and reduce cycle time and cost of the production of illustrations and training media. As computer graphic based systems have matured, so have the three-dimensional model databases that its methods were meant to display. Because real-world structure contains far more complexity than can be reasonably stored on computer storage media, the complexity of models developed has traditionally exceeded the capacity of the hardware required to display it. To deal with this problem, various methods have been developed to reduce the complexity of models while attempting to effect only minor changes on the perceived complexity to the eye. These methods may be divided into two categories: culling and detail elision.

Culling is the practice of not displaying objects that are invisible from a current viewing position. Such objects are considered "culled" from the scene. Objects may be culled either from being hidden by another object or being outside the current viewing frustum. While culling to the viewing frustum is often straightforward, culling occluded objects can be difficult, although algorithms have been devised to solve this problem. The key to culling is having a fast method of determining the visibility of all objects in a scene.

Detail elision is the practice of displaying an object at a varying level of detail depending on the object's importance to the perceived complexity of the scene. This perceived importance has traditionally been measured by the size of the object in the screen picture elements (pixels). The key to using detail elision is to have several levels of detail available for all complex objects in the scene.

Although both of the techniques described above increase the speed of the image rendering process, neither process efficiently renders complex models containing millions of polygons at acceptable, real-time frame rates, such as 15–30 frames per second. For example, culling does not perform fast enough to keep pace with drawing a scene every 30th of a second. Detail elision, on the other hand, is most useful in capturing the complexity of patterns or textures in objects, especially two-dimensional structures or features. However, textures and patterns are far less useful in engineering visualizations, because objects look different from different viewpoints, while a texture correctly captures an object's appearance from only one viewpoint.

What is needed is a method and apparatus that is capable of processing a vast amount of objects at a speed fast enough to keep pace with drawing a scene at a real-time frequency. The method and apparatus should refrain from processing objects that fall outside of the display's boundaries or that are completely occluded by another object. However, processing of the objects should be decoupled from drawing the appropriate objects so the speed at which the objects are drawn is not slowed to the speed at which the objects are being processed. As described in the following, the present invention provides a method and apparatus that meet these criteria and solves other shortcomings in the prior art.

SUMMARY OF THE INVENTION

In accordance with the present invention, a method and apparatus are provided for rapidly rendering a graphical image of a complex structure, wherein the complex structure is represented by a plurality of objects. More specifically, a ray casting routine is implemented that casts a plurality of rays from a given vision coordinate, and for each casted ray, adds the object intersected by the casted ray that is the closest to the given vision coordinate to a set of visible objects. An object rendering routine is implemented that renders each object in the set of visible objects on a display in accordance with a current vision coordinate, as objects are added to the set of visible objects by the ray casting routine.

In accordance with further aspects of the invention, a plurality of ray casting routines are implemented in parallel such that each ray casting routine concurrently adds objects to the set of visible objects. In addition, to achieve stereovision, a plurality of discrete object rendering routines are implemented in parallel such that each object rendering routine renders each object in the set of visible objects on a display in accordance with the current vision coordinate, while each ray casting routine adds objects to the set of visible objects.

In accordance with yet further aspects of the invention, the plurality of objects representing the complex structure are organized into an object hierarchy. The object hierarchy comprises a root volume bounding the complex structure, subvolumes bounding each of the plurality of objects, and shrunken subvolumes bounding portions of each object. To determine which objects are intersected by the ray, the ray casting routine searches the object hierarchy to locate shrunken subvolumes intersected by the ray. Thus, for each shrunken subvolume intersected by the ray, the ray casting routine determines which shrunken subvolume has the smallest distance to the given vision coordinate and then stores the object associated with the shrunken subvolume in the set of visible objects.

As can be readily appreciated from the foregoing summary, the invention provides a method and apparatus for rapidly rendering graphical images of complex structures. The invention only renders those objects that are visible from the current vision coordinate. In addition, the process of adding visible objects to the set of visible objects is decoupled from the process of rendering visible objects so the speed at which the objects are rendered is not slowed to the speed at which the objects are being processed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 11 is a flow diagram illustrating the logic used to create the shrink-wrap boxes at the remaining levels of the shrink-wrap subhierarchy shown in FIG. 8;

DETAILED DESCRIPTION OF THE PREFERRED EMBODIMENT

Figure 1:
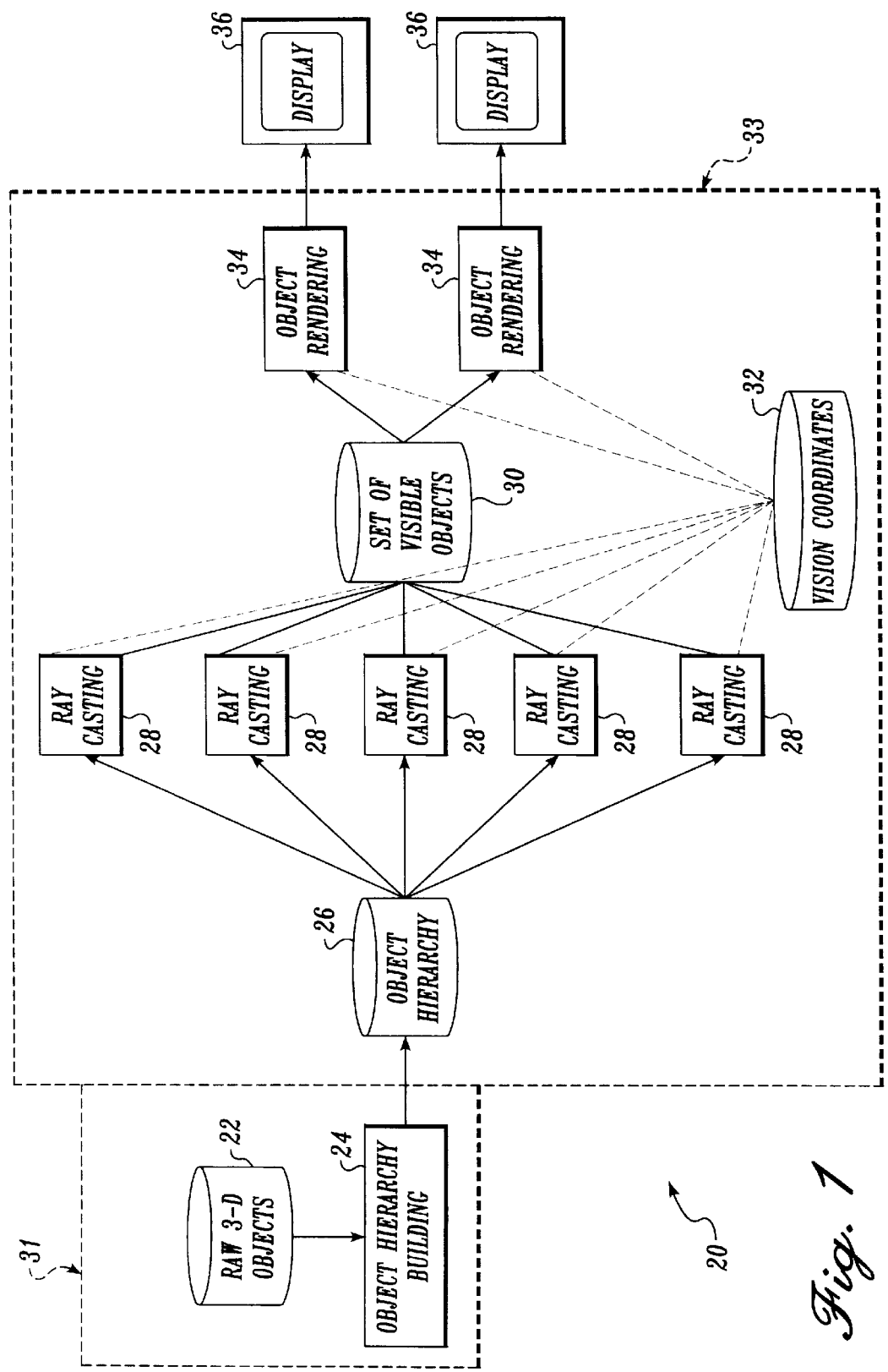
FIG. 1 is a block diagram representation of the image rendering system of the present invention.
Figure 2:
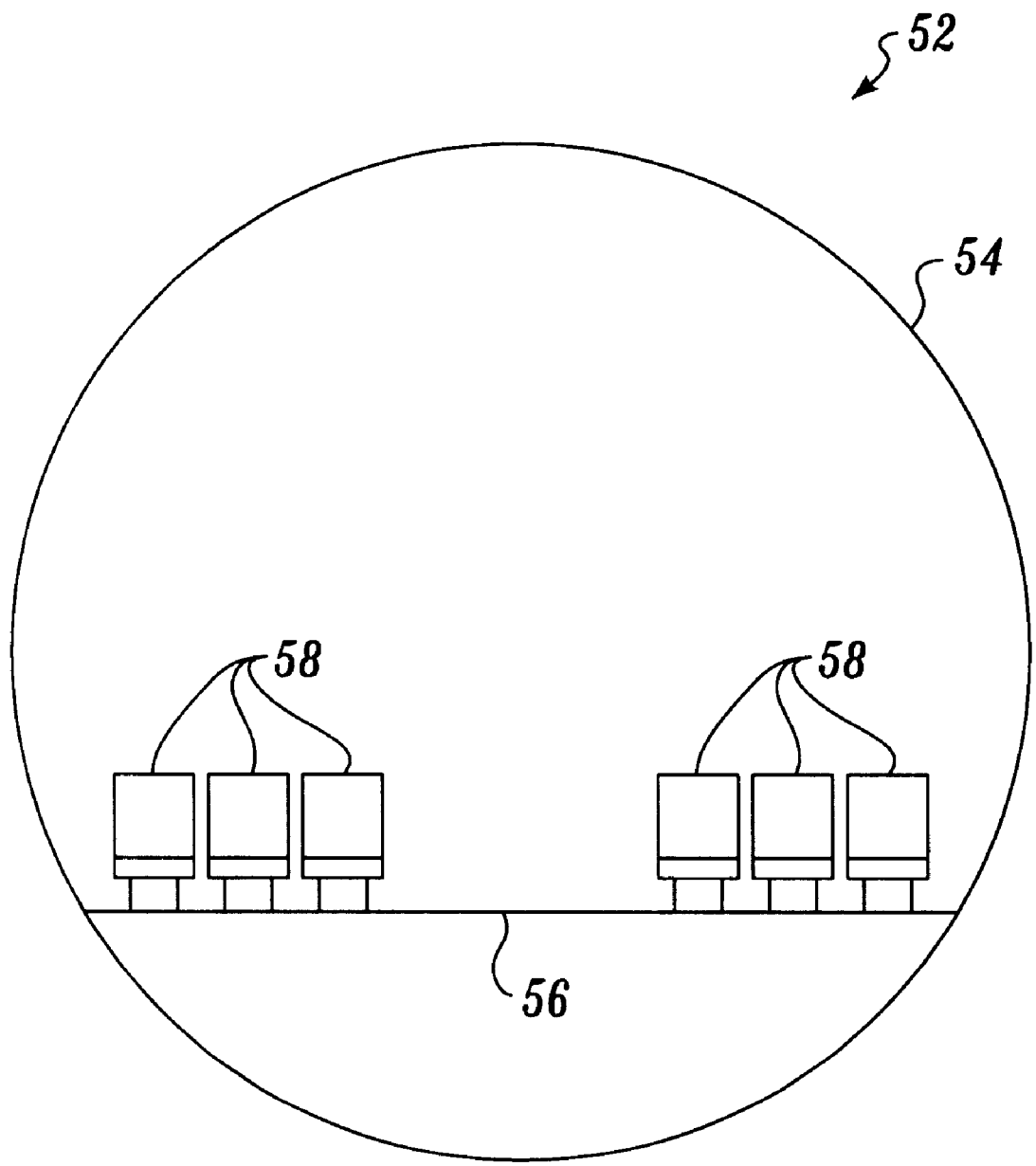
FIG. 2 is a two-dimensional, cross-sectional view of an aircraft structure of which the image rendering system shown in FIG. 1 may generate a graphical computer image.

FIG. 1 illustrates an image rendering system 20 used to rapidly render three-dimensional, graphical models of complex structures on a set of displays 36. A particular example of the type of a complex structure for which the image rendering system 20 of the present invention is particularly adept at creating a computer model is shown in FIG. 2. Scene 52 is a cross-sectional view of an aircraft structure. Scene 52 may be broken down into its component parts or "objects," such as the fuselage 52, each seat 58, and the deck 56. It will be appreciated by those of ordinary skill in the art that, for ease in illustration, scene 52 is depicted in two dimensions only, but that the following discussion is equally applicable to a three-dimensional representation of the aircraft structure. Scene 52 may exist in digital format, as a database 22 of raw, three-dimensional objects which may be generated by any of several well-known CAD/CAM programs. In the preferred embodiment of the present invention, the database was generated by a CAD/CAM program known as CATIA, which is available under license from Dessault.

In accordance with the present invention, the image rendering system 20 breaks down scene 52 into objects and renders the objects on a pair of displays 36, one display for each eye of a user in order to achieve stereovision. By limiting the objects to be rendered to only those objects visible from a certain viewpoint, and by rendering the objects on a display independently from determining which objects are visible, the present invention significantly increases the speed at which the aircraft structure depicted in scene 52, or any other complex structure is displayed. In fact, the image rendering system 20 can achieve real-time rendering of complex three-dimensional structures, i.e., approximately twenty to thirty frames per second.

Returning to FIG. 1, the image rendering system 20 of the present invention rapidly renders three-dimensional graphical images of complex structures using three major processes: an object hierarchy building process 24, a ray casting process 28, and an object rendering process 34. The object hierarchy building process 24 processes the database 22 of raw, three-dimensional objects into an object hierarchy representing the aircraft structure displayed in scene 52 and stores the object hierarchy in a database 26. The ray casting process 28 determines the set of objects visible from successive observer viewpoints and stores the set of visible objects in a database 30. Finally, the object rendering process 34 reads objects from the visible object set stored in database 30 and draws the visible objects from the perspective of the observer's current viewpoint on a display 36. As the observer's current viewpoint changes, the visible objects are redrawn by the object rendering process 34 accordingly.

In the preferred embodiment of the present invention, five ray casting processes 28 are implemented in parallel, while two object rendering processes 34 are implemented in parallel. However, the ray casting processes 28 are decoupled and run asynchronously from the object rendering processes 34 so that the ray casting processes 28 are not allowed to slow the speed of object rendering. Consequently, while each of the ray casting processes 28 processes the object hierarchy stored in database 26 and adds visible objects to the set of visible objects stored in database 30, each of the object rendering processes 34 simultaneously reads visible objects from the set of visible objects stored in database 30 and renders them on the displays 36.

Figure 3:
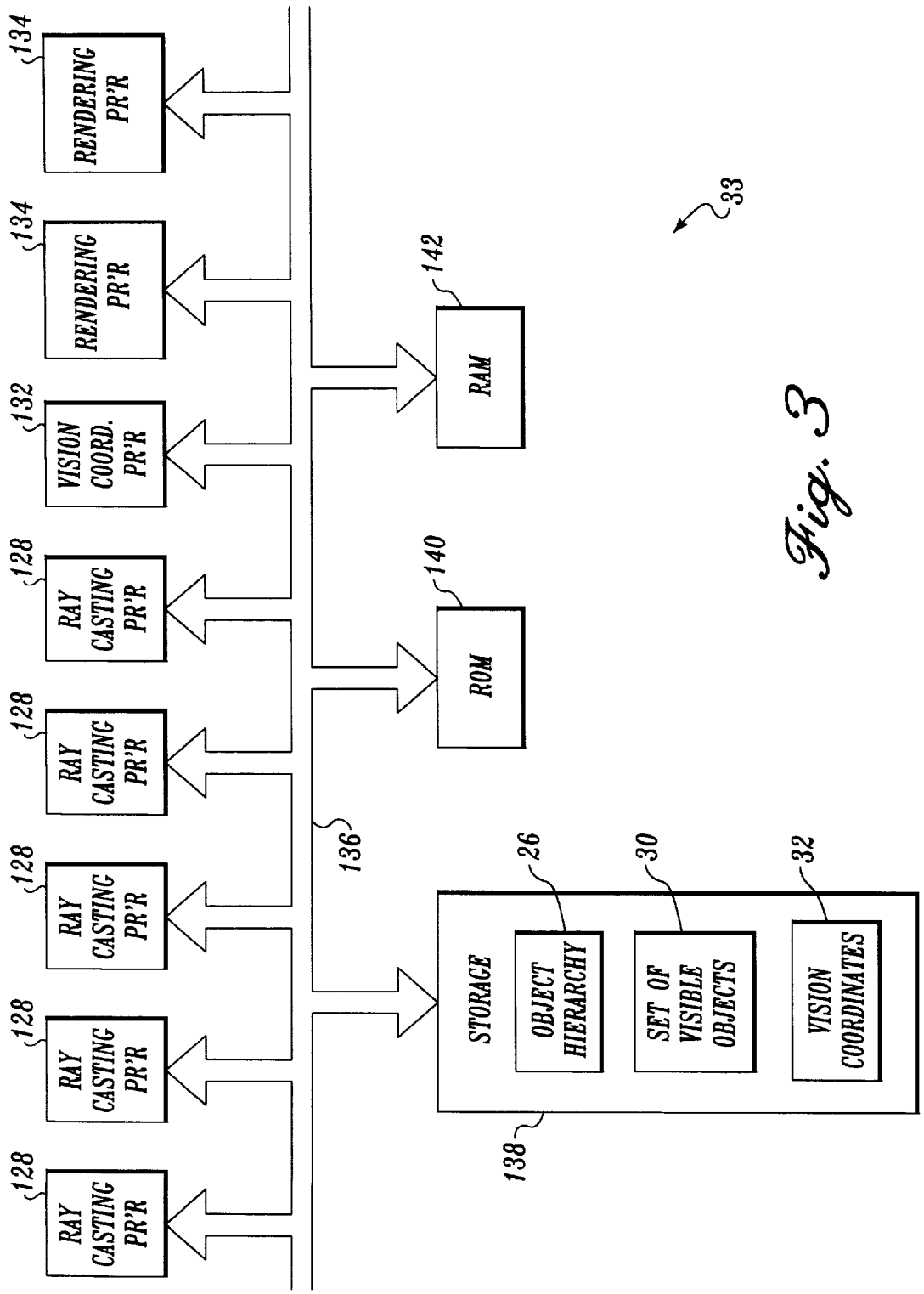
FIG. 3 is a block diagram of the several components of a computer used by the image rendering system shown in FIG. 1 to render graphical images.

In one embodiment of the present invention, the ray casting processes 28 and the image rendering processes 34 are performed by a large scale computer 33, the components of which are shown in FIG. 3. Each of the five ray casting processes 28 run on a separate ray casting processor 128, while the two image rendering processes 34 each run on a separate rendering processor 134. In addition, a vision coordinate processor 132 is provided to process the vision coordinates of the observer that are stored in the vision coordinate database 32. The ray casting processors 128, rendering processors 134 and vision coordinate processor 132 are coupled by a bus 136 to a read-only memory (ROM) 140 and a random access memory (RAM) 142. The processors respond to program instructions stored in the ROM 140 and temporarily in the RAM 142. The processors are also coupled to a permanent storage device 138, such as a hard disk drive, floppy disk drive, tape drive, optical drive, or a combination thereof. The permanent storage device 138 stores the program code and data necessary for casting rays, processing the vision coordinates and rendering the objects. In addition, the permanent storage device 138 contains the database 26 storing the object hierarchy, the database 30 storing the set of visible objects and the database 32 storing the vision coordinates. Permanent storage device 138, RAM 142 and ROM 140 are referred to as "shared memory" for purposes of the present invention because they store the database 30 of visible objects to which the ray casting processors 128 write visible objects and from which the rendering processors 134 asynchronously read visible objects. It will be appreciated by those of ordinary skill in the art that the computer used for rendering objects may include many more components than those shown in FIG. 3. Such components are not described because they are conventional, and a description of them is not necessary to an understanding of the present invention.

Figure 4:
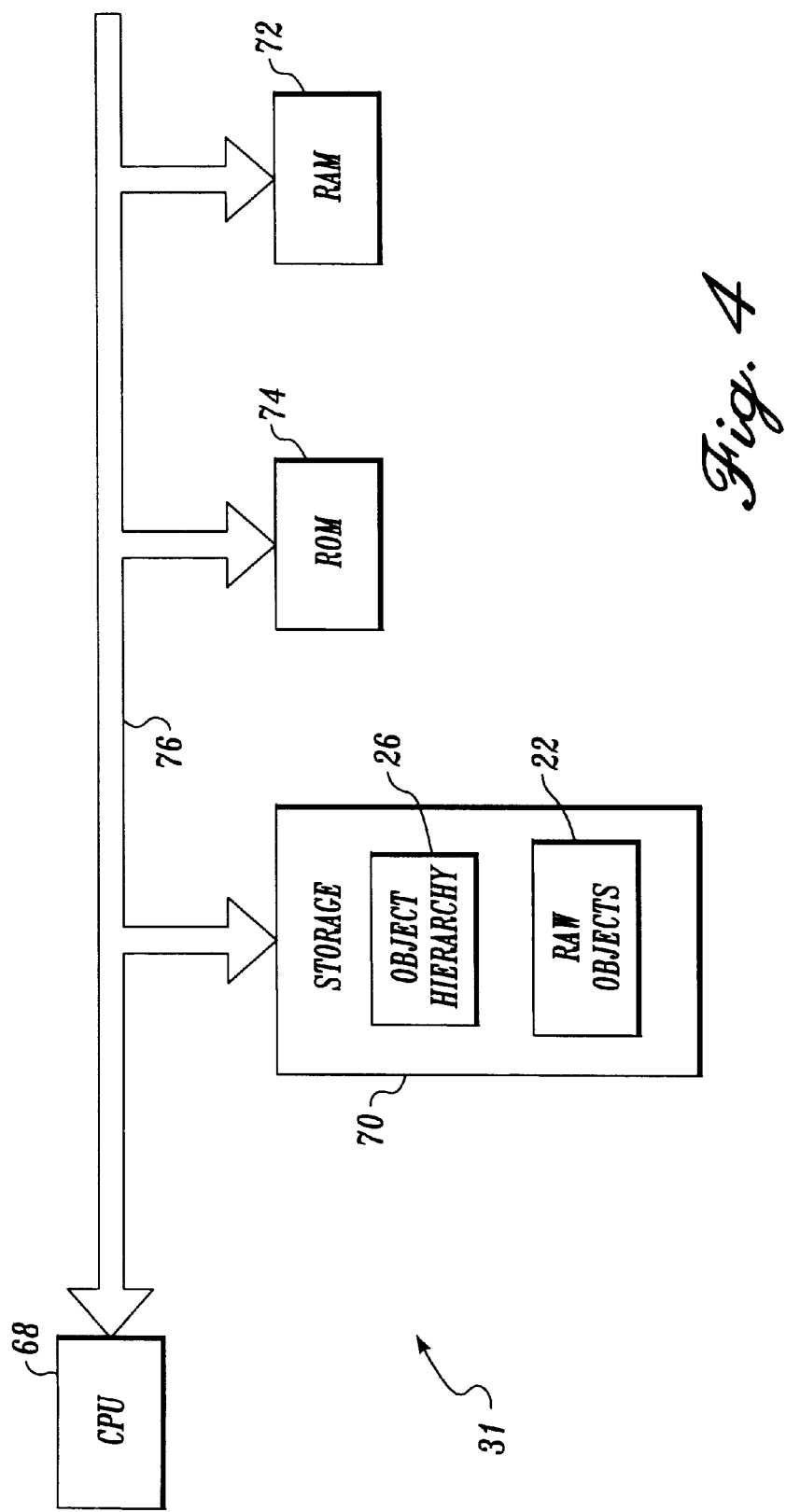
FIG. 4 is a block diagram of the several components of a computer used by the image rendering system shown in FIG. 1 to process the component parts or "objects" a complex structure into a hierarchy of spatially balanced boxes which are used to represent the objects of the complex structure.

Before the ray casting processes 28 and object rendering processes 34 can be performed by the computer 33, the raw, three-dimensional objects 22 stored in database 22 must be processed into an object hierarchy representing the scene 52. In the preferred embodiment of the present invention, the raw, three-dimensional objects are processed and stored in the object hierarchy database 26 by a computer 31 the components of which are shown in FIG. 4. The process 24 for building the object hierarchy is performed by a central processing unit (CPU) 68. The CPU 68 is coupled by a bus 76 to a read-only memory (ROM) 74 and a random access memory (RAM) 72. The CPU 68 responds to program instructions stored in the ROM 74 and temporarily in the RAM 72. The CPU 68 is also coupled to a permanent storage device 70, such as a hard disk drive, floppy disk drive, tape drive, optical drive, or a combination thereof. The permanent storage device 70 stores the program code and data necessary for building the object hierarchy. In addition, the permanent storage device 138 contains the database 22 of raw three-dimensional objects and the database 26 storing the object hierarchy built by the CPU 68. It will be appreciated by those of ordinary skill in the art that the computer 31 may include many more components than those shown in FIG. 4. Such components are not described because they are conventional, and a description of them is not necessary to an understanding of the present invention. Those of ordinary skill in the art will also recognize that in other embodiments of the present invention, the objects may be processed into the object hierarchy by the computer 33 performing the ray casting processes 28 and the object rendering processes 34.

Figure 5:
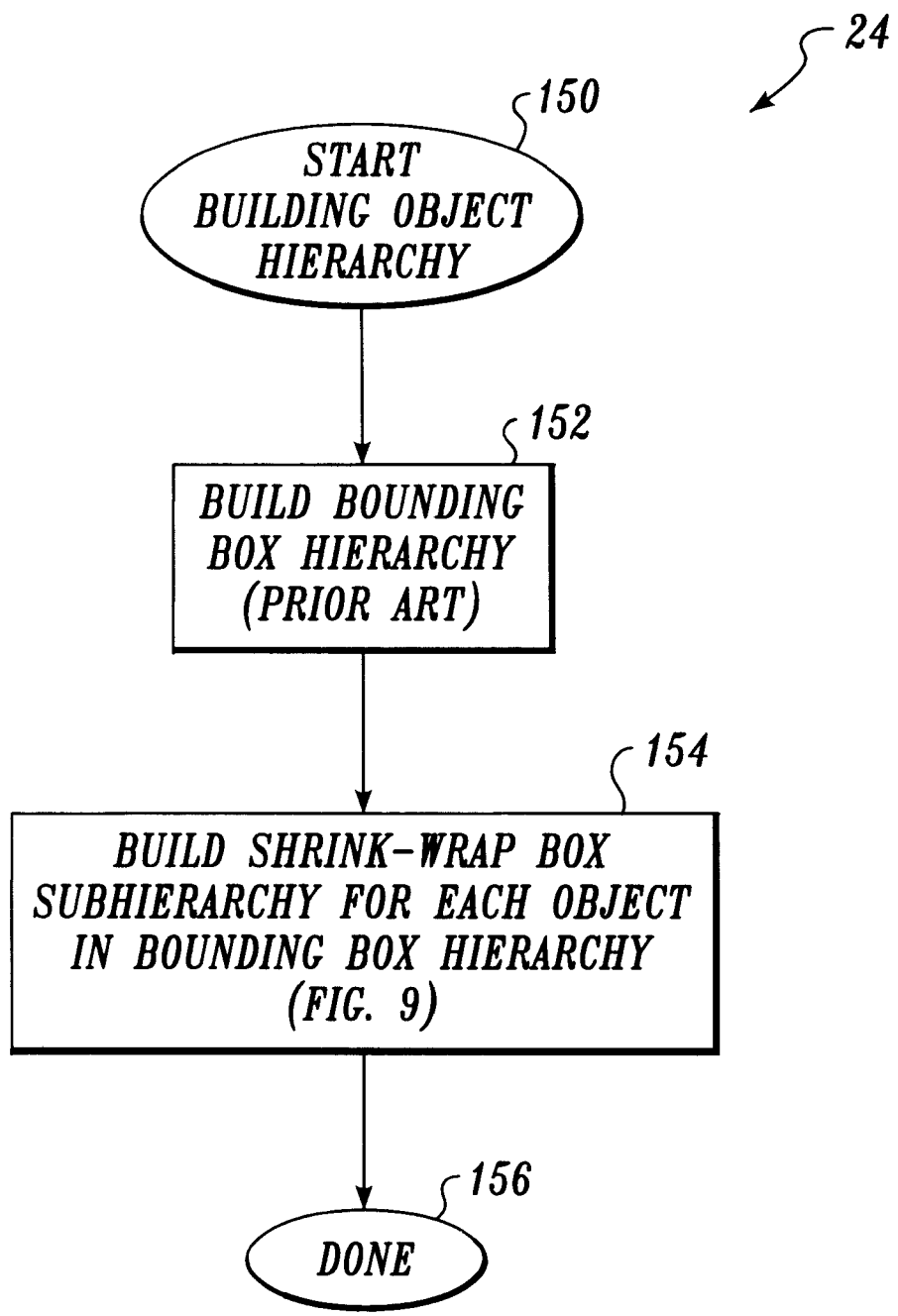
FIG. 5 is a flow diagram illustrating the logic used to process the objects of the complex structures into the hierarchy of spatially balanced boxes.

FIG. 5 depicts the logic implemented by the CPU 68 of the computer 31 to build the object hierarchy. It will be appreciated from the following discussion that the object hierarchy is built in two major steps. First, a bounding box hierarchy is created whose leaves bound each individual object of the scene. Next a subhierarchy, for which each leaf of the bounding box hierarchy serves as the root, is created for each object that further defines the object.

Figure 6:
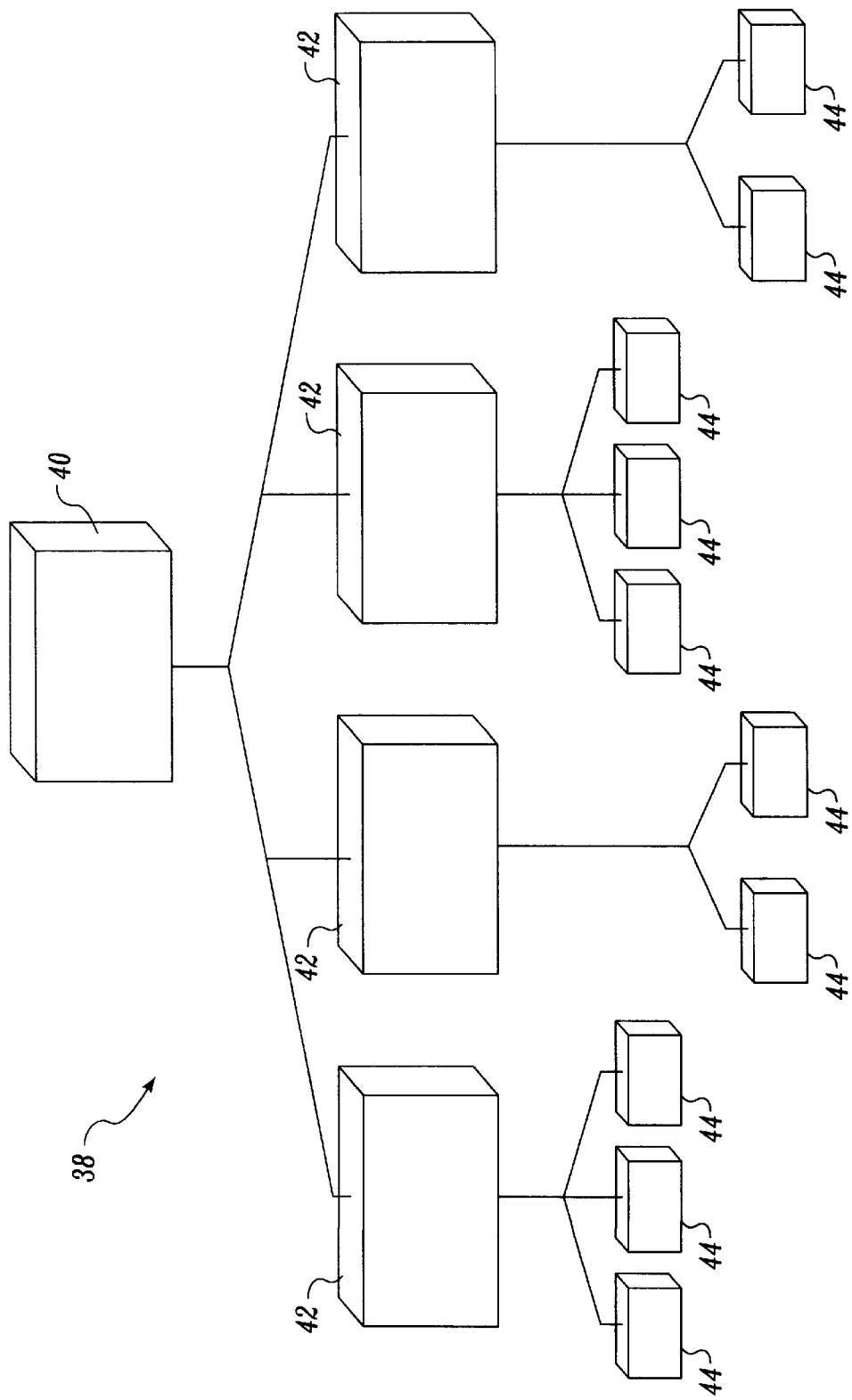
FIG. 6 (Prior Art) is a diagram of a hierarchy of spatially balanced bounding boxes which are used to represent the objects of the complex structure.

In this regard, the logic begins in FIG. 5 in a block 150 and proceeds to a block 152 where a subroutine is initiated for building the bounding box hierarchy. This subroutine processes the raw, three-dimensional objects of the scene 52 found in database 26 into a hierarchy of bounding boxes or volumes, from a root box bounding all objects in the scene, to sub-boxes bounding individual objects or portions thereof. As described in commonly assigned U.S. patent application Ser. No. 08/329,356, filed Oct. 26, 1994, entitled "METHOD FOR CREATING SPATIALLY BALANCED BOUNDING VOLUME HIERARCHIES FOR USE IN A COMPUTER GENERATED DISPLAY OF A COMPLEX STRUCTURE," to Eric L. Brechner, the disclosure and drawings of which are specifically incorporated herein by reference, the bounding box hierarchy subroutine surrounds each and every object in a scene with a three-dimensional box aligned with the scene's coordinate system. The axis-aligned boxes provide a very compact and efficient data structure for approximating an object's volume. At each level in the bounding box hierarchy, a parent bounding box encloses all of its children's bounding boxes. A bounding box hierarchy 38 representing scene 52 is illustrated in FIG. 6 (Prior Art). The bounding box hierarchy 38 has a root 40. Root 40 is a three-dimensional box which surrounds all of the objects in scene 52 i.e., the fuselage 54, seats 58, and the deck 56. The root 40 includes a number of children 42, each child comprising a three-dimensional box surrounding a subset of the objects in the scene 52. Each of the children 42 may also have a number of children. Each of these "grandchildren" of the root 40 can also have a number of children and so on. However, if a child has no more children, that child is referred to as a "leaf". In the bounding box hierarchy 38 illustrated in FIG. 6, each of the children 42 has its own children 44. Since the children 44, have no children of their own, they are referred to as leaves 44. Each leaf 44 comprises a three-dimensional box that surrounds individual objects in the scene, such as a seat 58 or deck 56.

The bounding-box hierarchy 38 is used by the image rendering system 20 to determine which objects in a scene are visible to the observer from the observer's current viewpoint. As will be described in more detail below, each of the ray casting processes 28 implemented by the image rendering system 20 casts a number of rays from the observer's current viewpoint into model space. To determine which objects are visible to the observer, it is first necessary to determine which rays cast from the current viewpoint intersect which objects. This is accomplished by checking each ray against the root 40 of the object hierarchy. If the ray intersects the root 40, then it is likely that the ray intersects one or more objects lower in the hierarchy, i.e., that the ray intersects one or more children, grandchildren or etc. of the root. Consequently, the ray is checked against the root's children, grandchildren, etc. until a leaf 44 is reached. If the ray intersects a leaf 44, then an object has been identified that the casted ray potentially intersects. Thus, an object has been identified that may be visible to the observer. To confirm that the ray intersects the object and that the object is visible, further analysis must be performed, as will be discussed in more detail below. However, those of ordinary skill in the art will recognize that by organizing the objects into such a hierarchy, and searching the hierarchy in the manner described above, candidate objects are identified at significant savings in computation.

Figure 7A:
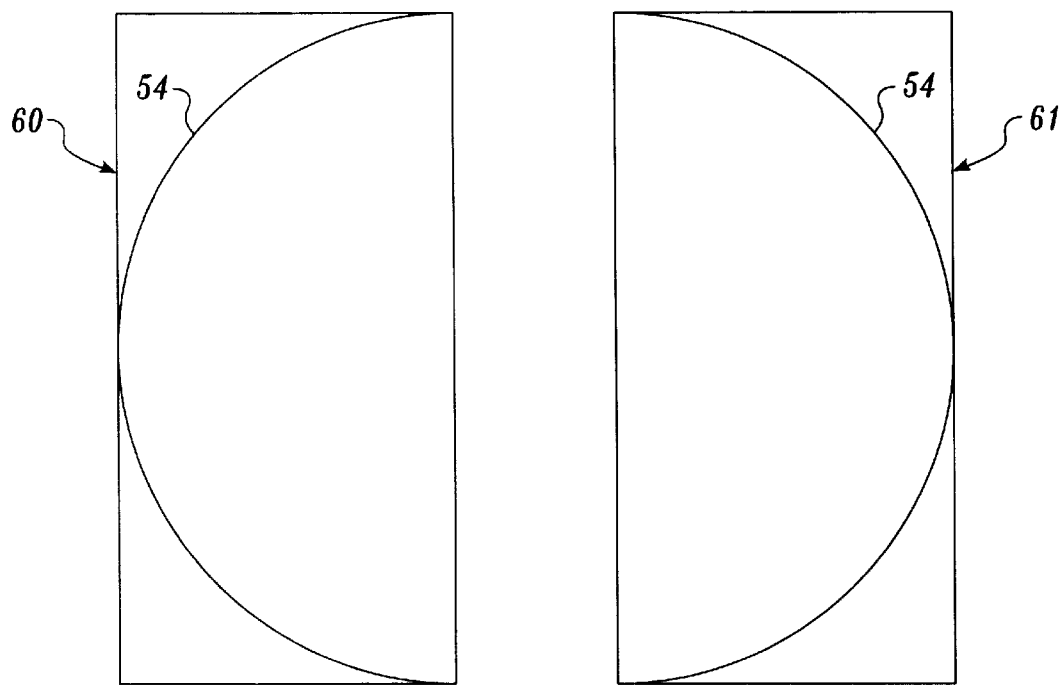
FIGS. 7A–7G illustrate the complex structure shown in FIG. 2 broken into objects bounded by spatially balanced bounding boxes, and portions of the objects bounded by spatially balanced shrink-wrap boxes.
Figure 7B:
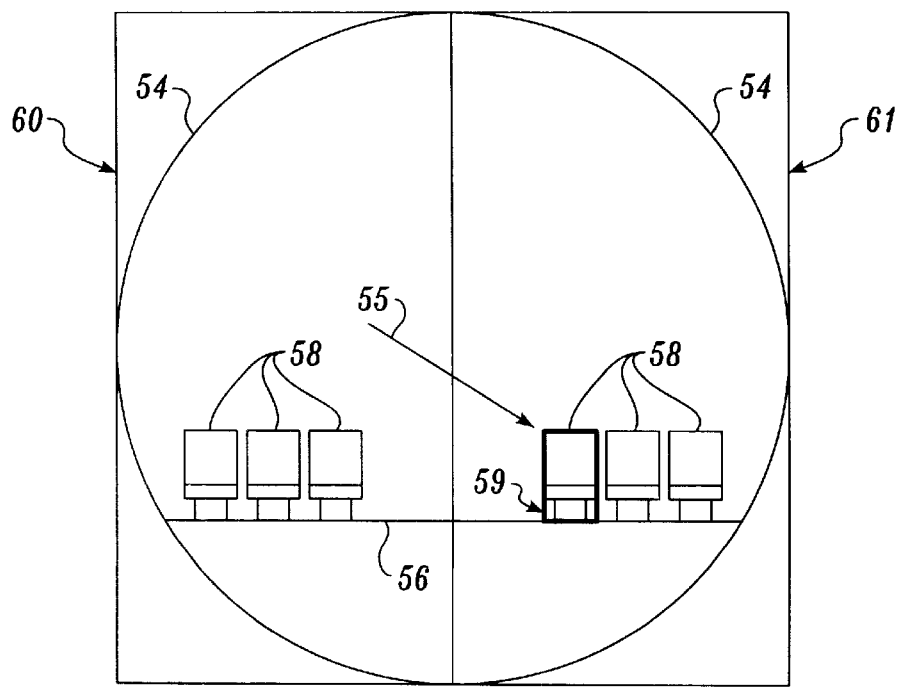

An example illustrating why such additional testing is necessary is shown in FIGS. 7A–7B. FIG. 7A illustrates the fuselage 54 of the aircraft structure split in halves, the left half surrounded by a bounding box 60, and the right half surrounded by a bounding box 61. From the above discussion, it will be appreciated that bounding box 60 and bounding box 61 each form a leaf 44 of the bounding box hierarchy 38 illustrated in FIG. 6. FIG. 7B illustrates the difficulty in using bounding boxes to determine if a ray extending from the user's current viewpoint intersects a particular object. More specifically, FIG. 7B illustrates bounding boxes 60 and 61 containing the two halves of the fuselage 54, a bounding box 59 surrounding a seat 58, and a ray 55 emanating from a viewpoint within the fuselage 54. As the ray extends from the current viewpoint, the ray first hits the bounding box 60 containing the left half of the fuselage 54. However, the left half of the fuselage 54 is behind the current viewpoint, i.e., behind the observer and thus, not seen. The ray 55 then hits the bounding box 61 of the right half of the fuselage 54. However, the first object that should be visible to the observer along this ray is the seat 58 surrounded by the bounding box 59, not the right half of the fuselage 54. The ray will only intersect the bounding box 59 of the seat 58 after it has intersected the bounding box 60 of the left half of the fuselage 54 and the bounding box 61 of the right half of the fuselage 54.

Since an object's bounding box cannot be used alone to determine whether or not a ray intersects that object, further analysis of that object is necessary. As will be described below, each bounding box leaf 44 is divided into a number of uniform three-dimensional subdivisions, discarding any subdivisions that do not contain a portion of the object, and shrinking the remaining subdivisions so that they bound the surface of the object as closely as possible. Each of these shrunken subdivisions is referred to as a "shrink-wrap box." The shrink-wrap boxes bounding the surface of the object further define the object and form a subhierarchy, for which the leaf 44 for that object is the root, in the original bounding box hierarchy 38. Accordingly, the logic in FIG. 5 proceeds from the routine for building the bounding box hierarchy in block 152 to a subroutine for building the shrink-wrap box subhierarchies for each object in a block 154.

Figure 7C:
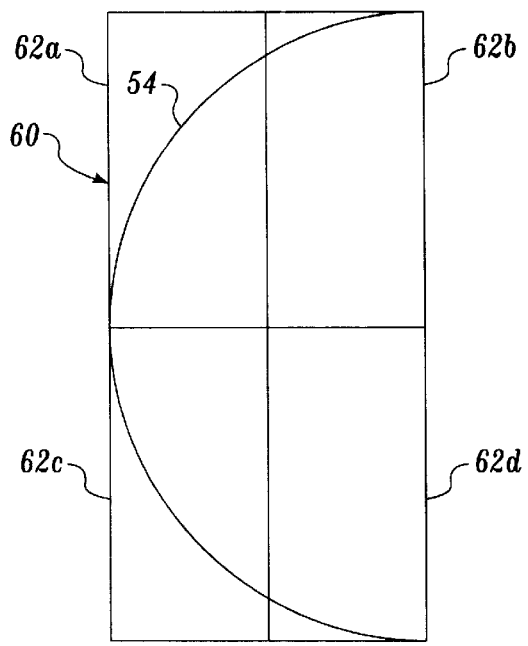
Figure 7D:
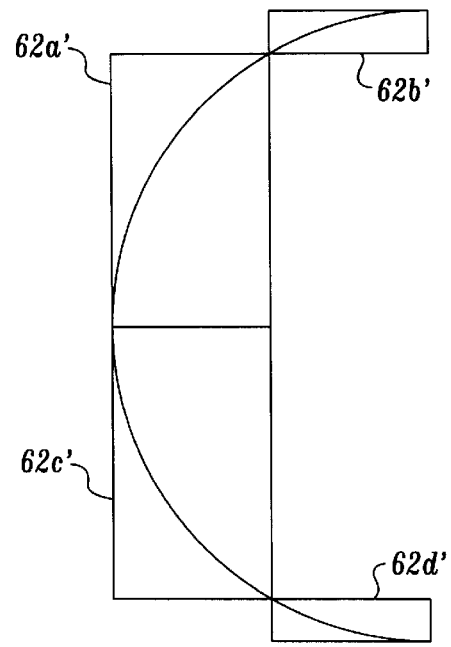

FIGS. 7C–7G illustrate how an object is divided into shrink-wrap boxes. FIG. 7C shows bounding box 60 for the left half of the fuselage 54 divided into four uniform subdivisions 62a–62d. It will be appreciated, however, that if the left half of the fuselage 54 were depicted in three-dimensional form, the bounding box 60 would be divided into eight uniform subdivisions. As will be described in more detail below, the result of shrinking the four uniform subdivisions 62a–62d is to form four shrink-wrap boxes 62a'–62d' as shown in FIG. 7D, each of which bounds the left half of the fuselage object 54 as closely as possible. However, it is possible to obtain shrink-wrap boxes that approximate the surface of the left half of the fuselage 54 even more closely.

Figure 7E:
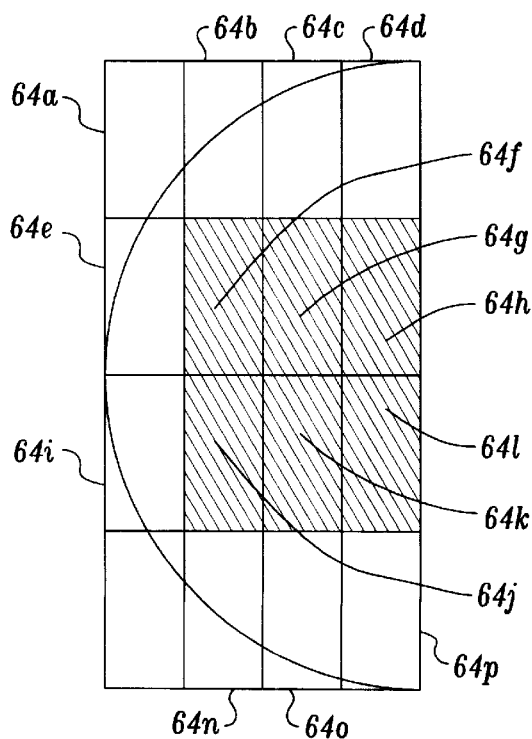
Figure 7F:
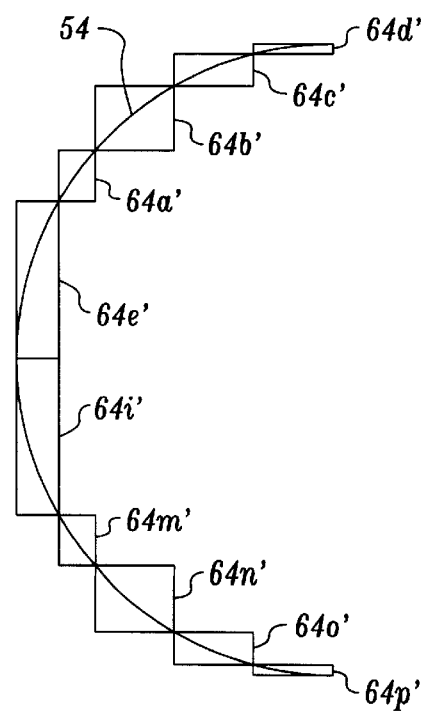

FIG. 7E shows bounding boxes 60 subdivided into sixteen equally sized subdivisions 64a–64p. However, subdivisions 64f–64h and 64j–64l do not contain a portion of the left half of the fuselage 54. As will be described in more detail below, only those subdivisions containing a portion of the surface of the object are maintained and added to the shrink-wrap box subhierarchy for the object. The empty subdivisions 64f–64h and 64j–64l are not added to the shrink-wrap subhierarchy for the object. The result of shrinking the remaining subdivisions 64a–64e, 64i and 64m–64p and discarding subdivisions 64f–64h and 64j–64l is shown in FIG. 7F. Subdivisions 64a–64e, 64i and 64m–64p are shrunken to form shrink-wrap boxes 64a'–64e', 64i' and 64m–' 64p', which closely approximate the curvature of the fuselage.

Figure 8:
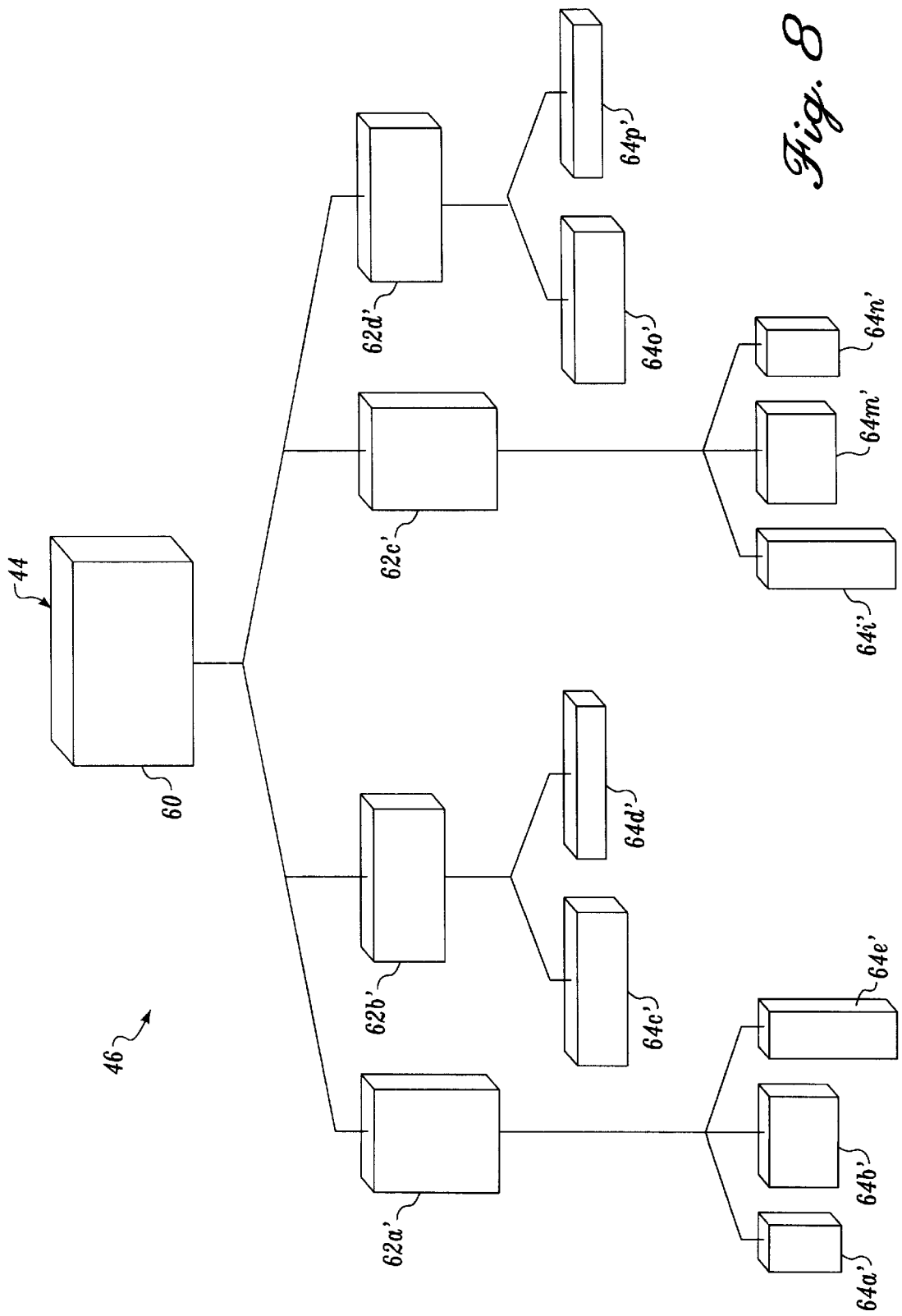
FIG. 8 is a diagram of a subhierarchy of shrink-wrap boxes further defining the surface of an object whose root is a leaf of the hierarchy shown in FIG. 6.

The resulting shrink-wrap box subhierarchy 46 for the left half of the fuselage 54, is illustrated in FIG. 8. The bounding box 60 (i.e., a leaf 44 of the bounding box hierarchy 38) for the left half of the fuselage object 54 has four children 62a'–62d'. Shrink-wrap box 62a' has three children 64a', 64b', and 64e'; shrink-wrap box 62b' has two children 64c' and 64d'; shrink-wrap box 62c' has three children 64i', 64m' and 64n'; and shrink-wrap box 62d' has two children 64o' and 64p'. The result is a shrink-wrap box subhierarchy 46 that closely approximates the surface of the left half of the fuselage 54. Those of ordinary skill in the art will appreciate that how accurately the object's surface is approximated depends on how many times an object's bounding box is subdivided. However, the more subdivisions, the more complex the shrink-wrap box subhierarchy 46 becomes. Therefore, in the preferred embodiment of the present invention, a fixed depth for subdividing an object's bounding box 44 is chosen at three levels deep.

Figure 7G:
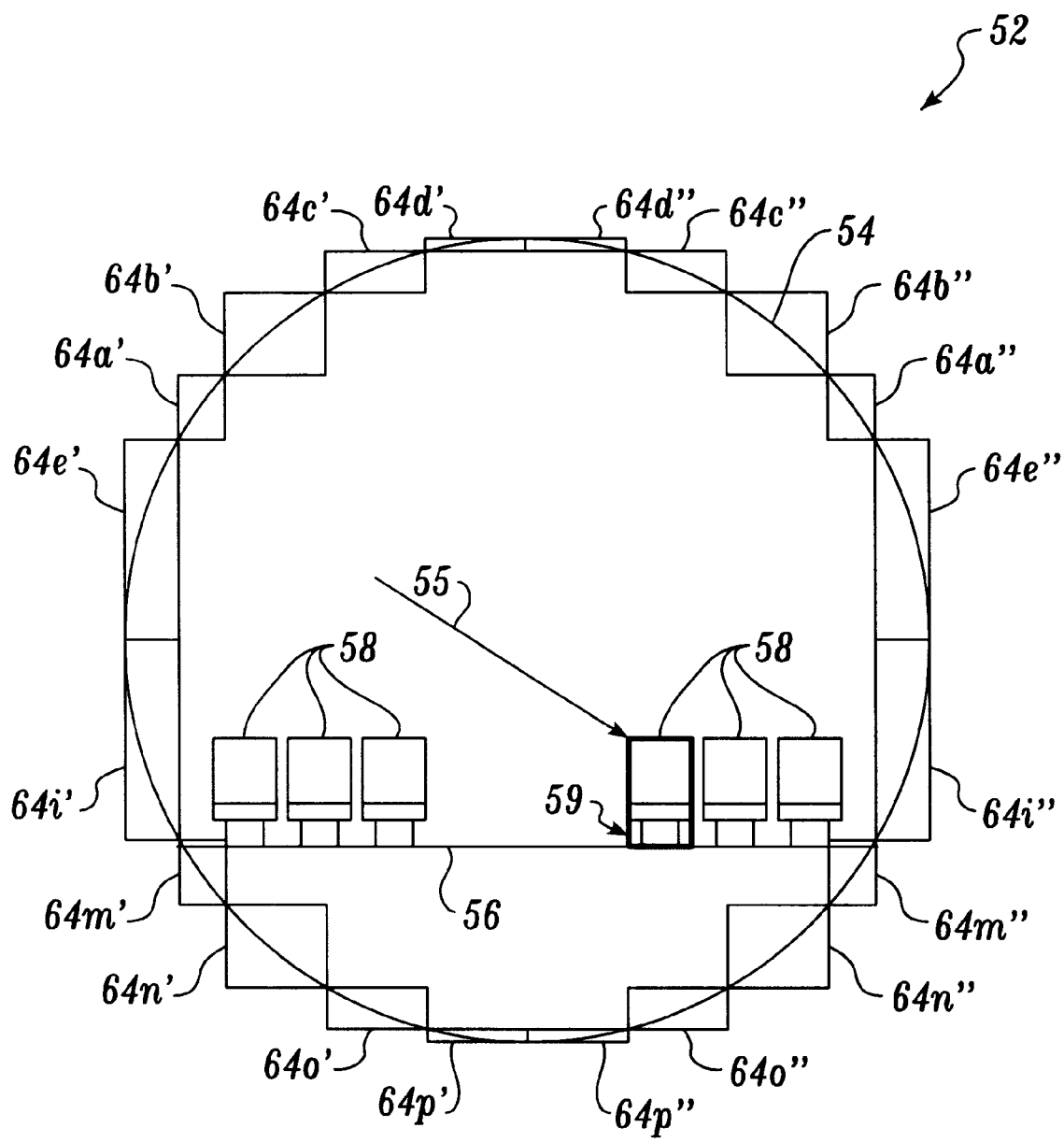

FIG. 7G illustrates the ultimate result of using shrink-wrap boxes to bound the scene 52. Since the entire fuselage 54 is now bounded by shrink-wrap boxes, the ray 55 emanating from the current viewpoint intersects the bounding box 59 of the seat 58, rather than the bounding box 60 or 61 of either half of the fuselage. Accordingly, the seat 58 is added to the set of visible objects and drawn by the object rendering process 34 as will be described in more detail below.

Figure 9:
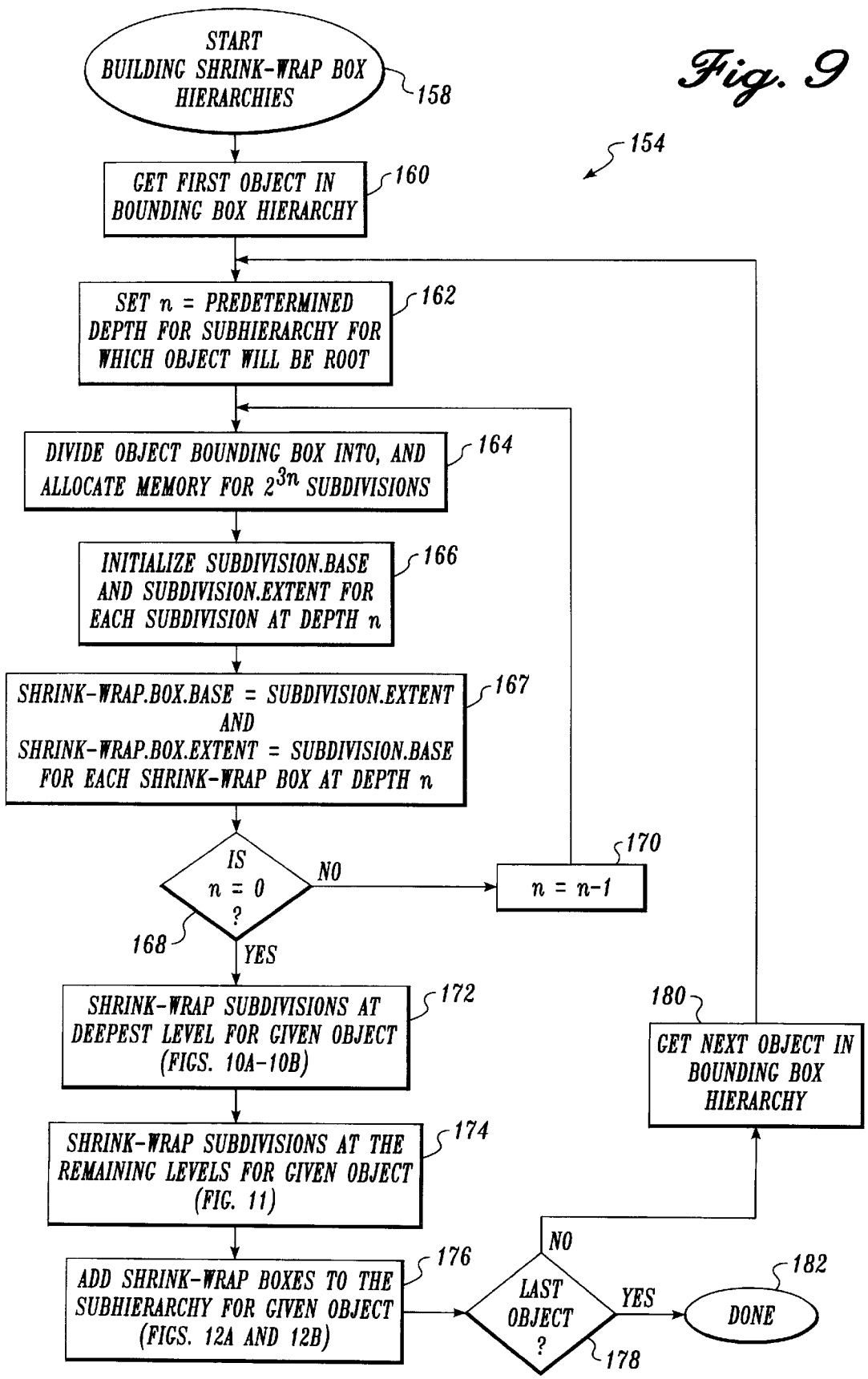
FIG. 9 is a flow diagram illustrating the logic used to build a subhierarchy of shrink-wrap boxes for each object of the complex structure.

The logic used to build the shrink-wrap box subhierarchies 46 for each object is illustrated more specifically in FIG. 9. The logic begins in a block 158 and proceeds to a block 160 where a first object in the bounding box hierarchy 38 shown in FIG. 6 is obtained. It will be appreciated that the object is a leaf 44 of the hierarchy 38. In a block 162, a variable n is set equal to a predetermined depth for the subhierarchy 46 for which the object will be the root. In the preferred embodiment of the present invention, each shrink-wrap box subhierarchy will be three levels deep (not counting the root), wherein level n=0 is the root of the subhierarchy and level n=3 is the deepest level of the subhierarchy. As noted above, the depth of the shrink-wrap box subhierarchy can be increased or decreased depending on the level of detail desired in the image ultimately rendered.

The shrink-wrap box subhierarchy 46 for each object is built by first allocating storage in memory for the uniform subdivisions into which the object's bounding box is divided, shrinking the subdivisions to form shrink-wrap boxes and then adding the shrink-wrap boxes which contain a portion of the object to the shrink-wrap box subhierarchy 46 for the object. In this regard, the logic proceeds from block 162 to a block 164 where the object's bounding box is divided into $2^{3n}$ uniform subdivisions that are stored in memory in a one-dimensional array having $2^{3n}$ entries.

In a block 166, the size of each subdivision at depth n is initialized. More specifically, the base of the subdivision, i.e., the minimum of the x,y,z coordinates forming any corner of the subdivision, is initialized to the smallest base permissible for a subdivision at that particular depth; and the extent of the subdivision, i.e., the largest of the x,y,z coordinates forming any corner of the subdivision, is initialized to the largest extent permissible for a subdivision at that particular depth. In block 167, the dimensions of the shrink-wrap boxes that will be created from the subdivisions at depth n are initialized. More specifically, the base of each shrink-wrap box to be created at depth n is set equal to the extent of the subdivision at that depth, while the extent of each shrink-wrap box is set equal to the base of the subdivision. By inverting the dimensions of each shrink-wrap box in this manner, it is ensured that the dimensions of each shrink-wrap box ultimately created will be of the appropriate size.

Once the dimensions of each subdivision at depth n are initialized, the logic determines if n=0 in a decision block 168. If not, the subdivisions at each level of the subhierarchy 46 have not yet been initialized. Therefore, the logic proceeds to a block 170 where the value n is decremented so that the subdivisions at the next lowest level of the subhierarchy 46 can be initialized. Blocks 164 through 170 are then repeated until storage in memory has been allocated and the base and extent have been initialized for each possible subdivision. Since n is initialized to a predetermined depth of three in the preferred embodiment of the present invention, memory is allocated for 584 subdivisions (not counting the root) in the three-dimensional case (eight children with 64 grandchildren with 512 great-grandchildren). It will be appreciated, however, that the present invention can also be used to render two-dimensional graphic images. In that case, memory is allocated for 276 subdivisions (four children with 16 grandchildren and 256 great-grandchildren).

Once initialization of the subdivisions and allocation in memory for the subdivisions is complete, the logic proceeds from decision block 168 to a block 172 where shrink-wrapping of the subdivisions at the deepest level of the shrink-wrap subhierarchy 46 occurs for the given object. It will be appreciated from the foregoing description, that "shrink-wrapping" subdivisions means shrinking each preinitialized subdivision at the given level to a size that best approximates the surface of the object contained in the subdivision.

Figure 10A:
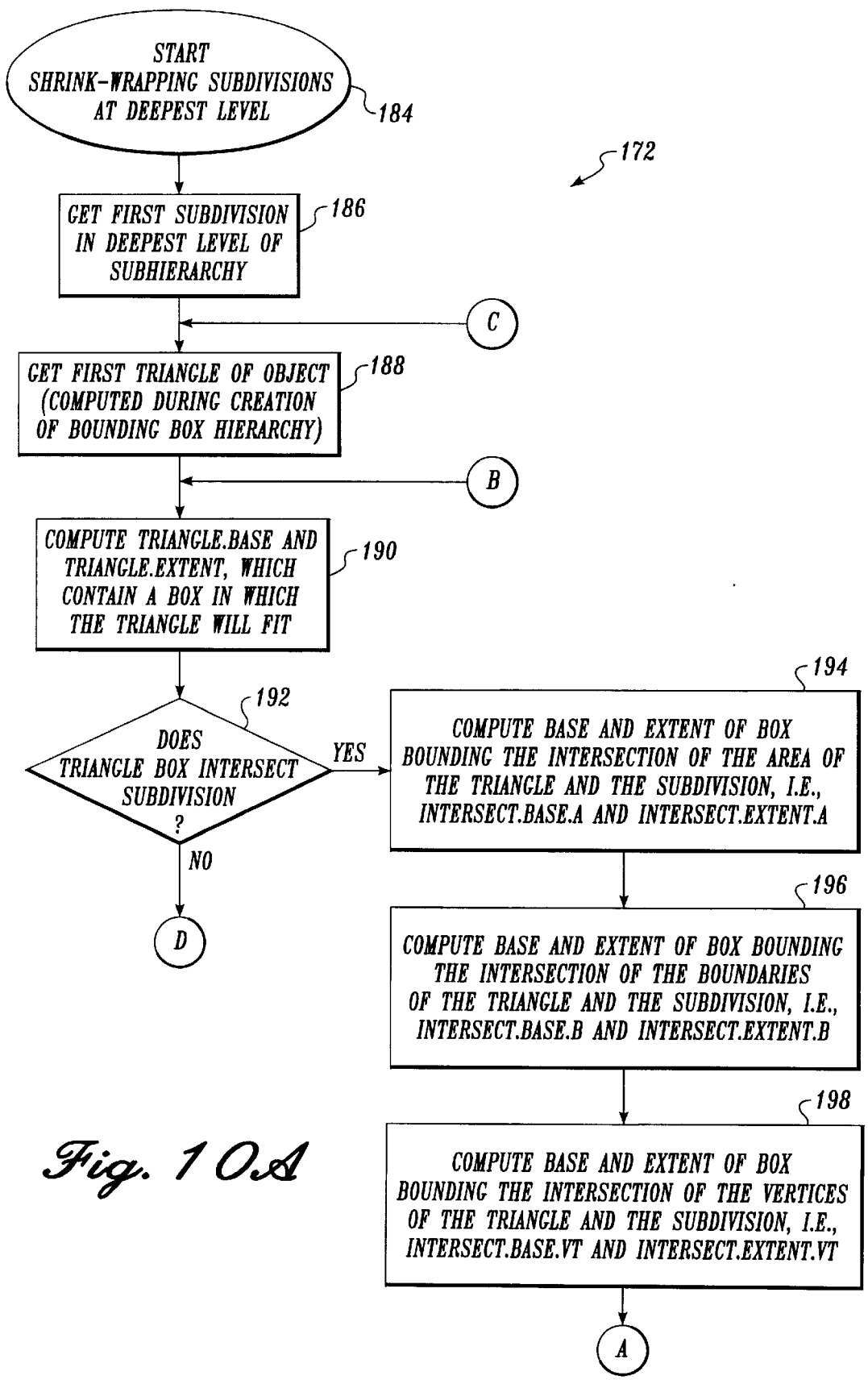
FIGS. 10A–10B are flow diagrams illustrating the logic used to create the shrink-wrap boxes at the lowest level of the shrink-wrap subhierarchy shown in FIG. 8.
Figure 10B:
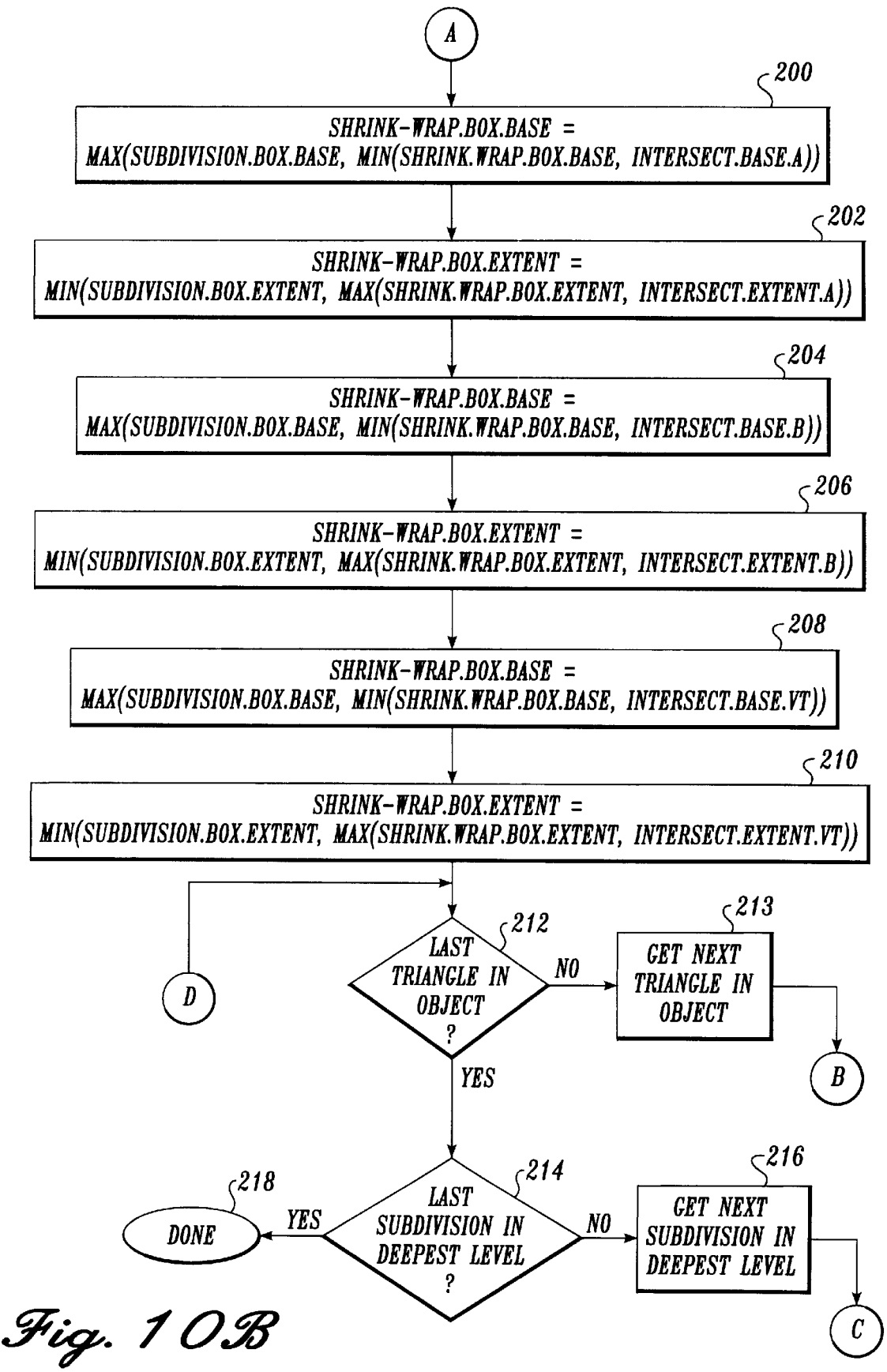

The logic for shrink-wrapping the object at the deepest level is shown in more detail in FIGS. 10A and 10B. The logic begins in FIG. 10A at a block 184 and proceeds to a block 186 where the first preinitialized subdivision in the deepest level of the subhierarchy is obtained from the array in memory allocated for subdivisions at the deepest level. In order to shrink this, or any other subdivision, to the size that best approximates the portion of the object found within the subdivision, it is necessary to determine how the object intersects the subdivision.

Those of ordinary skill in the art of computer graphics will recognize that objects are often represented or modeled by a mesh of two-dimensional triangles. Accordingly, the intersection of an object with a subdivision can be determined from the intersection of the subdivision with the triangles of the mesh representing the surface of the object. In the preferred embodiment of the present invention, the triangle mesh for each object is computed during creation of the bounding box for the object by methods well-known in the computer graphics art and further described in Scroeder, W. J., Zarge, J. A., Lorenson, W. E., *Decimination of Triangle Meshes*, COMPUTER GRAPHICS (SIGGRAPH '93 Proceedings), 26(2):65–70, July 1992 and Hoppe, H., DeRose, T., Duchamp, T., McDonald, J., Stuetzle, W., *Mesh Optimization*, COMPUTER GRAPHICS (SIGGRAPH '93 Proceedings), Annual Conference Series, 247–254, August 1993, the disclosure of both of which is incorporated herein by reference.

Accordingly, once the first subdivision at the deepest level of the subhierarchy is obtained, the first triangle of the mesh used to represent the object is obtained from memory in a block 188. The triangle is bound by its own two-dimensional box, the base and the extent of which is computed in a block 190. In a decision block 192, the logic determines if the box in which the triangle fits intersects the given subdivision. If not, the logic proceeds to a decision block 212 in FIG. 10B where it determines if the last triangle of the mesh used to represent the object has been processed. If not, the logic proceeds to a block 213 where the next triangle of the mesh used to represent the object is obtained. The logic then returns to block 190 and the base and extent of the box in which the next triangle fits is computed. Box 190 and 192 are thus repeated for each triangle of the mesh used to represent the object.

If the result of decision block 192 is positive, and the box bounding the given triangle intersects the given subdivision, the logic proceeds to blocks 194 through 198 so that the dimensions of the intersection between the given triangle and subdivision can be computed. It will be appreciated that any given triangle intersects a subdivision in three ways: (1) the area of the triangle intersects the given subdivision; (2) the line segments forming the boundaries of the triangle intersect the given subdivision; and (3) the vertices of the triangle intersect the given subdivision. In each of these cases, the intersection of the triangle and the subdivision defines a set of points that can be bound by their own box. As will be described in more detail below, the dimensions of the boxes bounding the intersection of the triangle and the subdivision are used to shrink-wrap the subdivision.

In a block 194, the base and extent of a box bounding the intersection between the area of the given triangle and the subdivision are computed. In a block 196, the base and extent of a box bounding the intersection between the boundaries of the triangle and the subdivision are computed. In a block 198, the base and extent of a box bounding the intersection between the vertices of the triangle and the subdivision volume are computed. Those of ordinary skill in the art will recognize that the base and extent in each of these cases is calculated using differential equations well-known in the art and thus, will not be specifically set forth herein.

In FIG. 10B, the logic proceeds to a series of blocks that shrink-wrap the given subdivision using the information calculated in blocks 194–198. More specifically, the logic proceeds to a series of blocks 200–210 in which the base and extent of the subdivision are recalculated, thus forming the base and extent of the shrink-wrap box created from the subdivision. Accordingly, the recalculated base and extent of each subdivision are referred to in blocks 200–210 as the base and extent of the shrink-wrap box created from the subdivision. Hence, in block 200, the shrink-wrap box base is set equal to the maximum of the base of the current subdivision compared with the minimum of the current value for the base of the shrink-wrap box and the base of the box bounding the intersection of the triangle's area and the subdivision. In other words, the new base of the shrink-wrap box is set to either the base of the subdivision or the smaller of the current shrink-wrap box base and the intersected box base. Since the base of the subdivision is initialized in block 166 of FIG. 9 to be the smallest base permissible, the calculation in block 200 ensures that the base of the shrink-wrap box never becomes smaller than the base of the subdivision. Conversely, the upper bound for the base of the shrink-wrap box created from the subdivision is the smaller of the current base of the shrink-wrap box and the base of the box bounding the intersection.

A similar calculation is made in a block 202 for the extent of the shrink-wrap box created from the current subdivision. Specifically, the new shrink-wrap box extent is set equal to the minimum of the extent of the subdivision compared with the maximum of the current value for the extent of the shrink-wrap box and the extent of the box bounding the intersection of the triangle's area and the subdivision. Since the extent of the subdivision is initialized in block 166 of FIG. 9 to be the largest extent permissible, the calculation in block 202 ensures that the extent of the shrink-wrap box never becomes larger than the extent of the subdivision. Conversely, the lower bound for the new extent of the shrink-wrap box is the larger of the current extent of the shrink-wrap box and the extent of the box bounding the intersection.

The base and extent for the shrink-wrap box created from the subdivision are further refined in blocks 204–210. In blocks 204–210 the base and extent are repeatedly recalculated as described above with respect to blocks 200 and 202 except that the base and extent of the box bounding the intersection of the triangle's boundaries with the subdivision and of the box bounding the intersection of the triangle's vertices and the subdivision are used. Thus, by the time the logic exits block 210 and proceeds to a decision block 212, a base and extent have been computed for a shrink-wrap box that best approximates the surface of the object that falls within it.

After the base and extent of the shrink-wrap box are computed, the logic proceeds to decision block 212 where it determines if the last triangle of the object has been processed. If not, the logic proceeds to block 213 where the next triangle in the mesh representing the object is obtained. The logic then returns to block 190 on FIG. 10A and the base and extent for the box bounding the next triangle is computed. Blocks 190 through 213 are then repeated for each triangle of the object. Consequently, when the last triangle in the mesh representing the object is ultimately reached, the logic will proceed from decision block 212 to a decision block 214. It will be appreciated that by the time each triangle has been processed, the shrink-wrap box to be created from the given subdivision will be refined to provide the best approximation possible for the surface of the object contained in the shrink-wrap box.

In decision block 214, the logic determines if the last subdivision in the deepest level of the subhierarchy 46 has been processed. If not, the next subdivision in the deepest level of the shrink-wrap subhierarchy 46 is obtained in a block 216. The logic then returns to block 188, and blocks 188 through 216 are repeated for each subdivision in the deepest level of the shrink-wrap box subhierarchy 46. Consequently, each subdivision in the deepest level of the subhierarchy 46 is "shrink-wrapped" to the best approximation of the surface of the object contained by the box by comparing each subdivision to each triangle in the triangle mesh. When the last subdivision in the deepest level of the subhierarchy 46 is processed, the logic ends in a block 218.

Returning to FIG. 9, after the subdivisions in the deepest level of the subhierarchy have been shrink-wrapped in block 172, the logic proceeds to a block 174 where the subdivisions at the remaining levels of the subhierarchy 46 are shrink-wrapped. The logic for shrink-wrapping the subdivisions at the remaining levels of the subhierarchy is illustrated in more detail in FIG. 11. The logic begins in a block 220 and proceeds to a block 222 where n is once again set equal to the predetermined depth for the subhierarchy, i.e., n=3. In a block 224, the first subdivision at the next deepest level, i.e., depth n−1 is obtained and stored as a parent. In a block 226, the children of the given parent are obtained. As described above, the subdivisions at each level of the subhierarchy 46 are stored in memory as a one-dimensional array having $2^{3n}$ entries. Therefore, the children of the first subdivision at depth n−1 are the first eight subdivisions (now shrink-wrap boxes created in accordance with the logic shown in FIGS. 10A and 10B) in the corresponding array storing the shrink-wrap boxes at depth n. The children of the next subdivision at depth n−1 are the next eight subdivisions (now shrink-wrap boxes) at depth n and so on.

In a block 228, the first child of the parent (i.e., the first of the eight shrink-wrap boxes obtained in block 226) is obtained. In block 230, the base of the parent subdivision is recalculated, or, in other words, the base of the shrink-wrap box created from the parent is calculated as the minimum of the base of the parent and the base of the child. In block 232, the extent of the parent is recalculated. More specifically, the extent of the shrink-wrap box created from the parent is set equal to the maximum of the extent of the parent and the extent of the child.

Once the base and extent of the shrink-wrap box created from the parent have been computed, the logic proceeds to a decision block 234 where it determines if the last child of the parent subdivision has been processed. If not, the logic proceeds to a block 236 and the next child of the parent subdivision (i.e., the next of the eight children at depth n) is obtained. Blocks 230–236 are then repeated for each child of the given parent subdivision. Consequently, the base and extent of the shrink-wrap box created from the parent subdivision are further refined until the shrink-wrap box best approximates the surface of the object contained in that box. In other words, a shrink-wrap box is computed that has the smallest base and largest extent of any of its children.

After the last child of the given subdivision has been processed, the logic proceeds from decision block 234 to a decision block 238 where it determines if the last subdivision at depth n−1 has been processed. If not, the logic proceeds to a block 240 and the next subdivision at depth n−1 is obtained. Blocks 230 through 236 are then repeated for every subdivision at the depth n−1. Therefore, for each subdivision at the given depth, a base and extent for a new shrink-wrap box is computed using the base and extent of each child of the subdivision. Once the last subdivision at the depth n−1 has been processed, the logic proceeds from decision block 238 to a decision block 242 where it determines if the subdivisions at each level of the shrink-wrap box subhierarchy 46 have been processed, i.e., if n=0. If not, the logic proceeds to a block 244 where the value for n is decremented. The logic then returns to block 224 where the first subdivision at the next deepest level is obtained. Blocks 224–242 are then repeated for the next deepest level in the subhierarchy until all of the predetermined levels of the subhierarchy have been processed and the base and extent of the shrink-wrap boxes at all of the levels have been determined. At that time, n will equal zero the logic will proceed from decision block 242 and end in a block 246.

Returning to FIG. 9, once the subdivisions at the remaining levels of the shrink-wrap box subhierarchy 46 have been shrink-wrapped in block 174, the logic proceeds to a block 176. In block 176, the shrink-wrap boxes are added to the bounding box hierarchy 38 as a subhierarchy 46 whose root is the bounding box leaf 44 for the object. The logic for adding the shrink-wrap boxes to the bounding box hierarchy 38 is illustrated in more detail in FIGS. 12A and 12B.

Figure 12A:
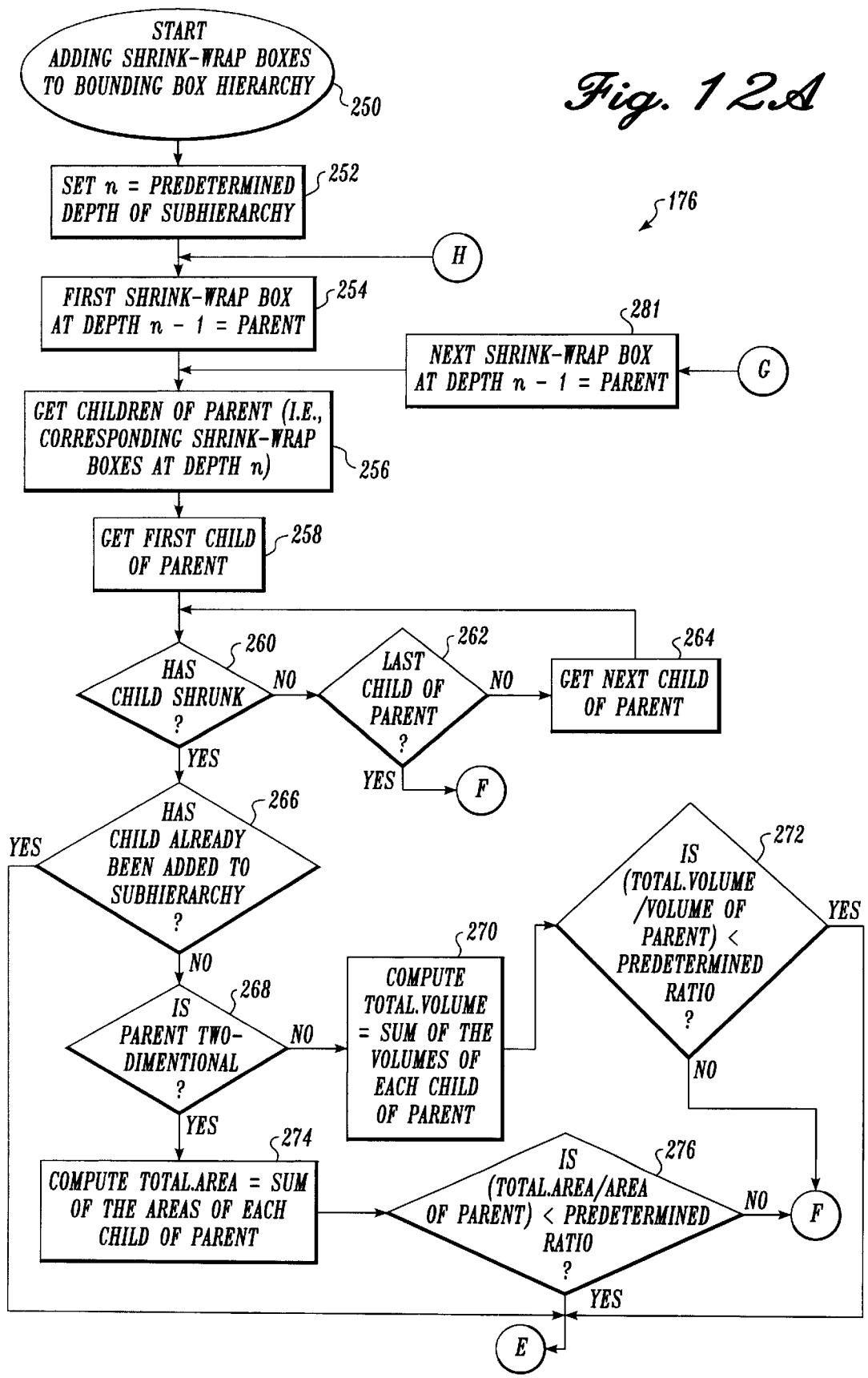
FIGS. 12A–12B are flow diagrams illustrating the logic used to add shrink-wrap boxes to the shrink-wrap subhierarchy shown in FIG. 8.
Figure 12B:
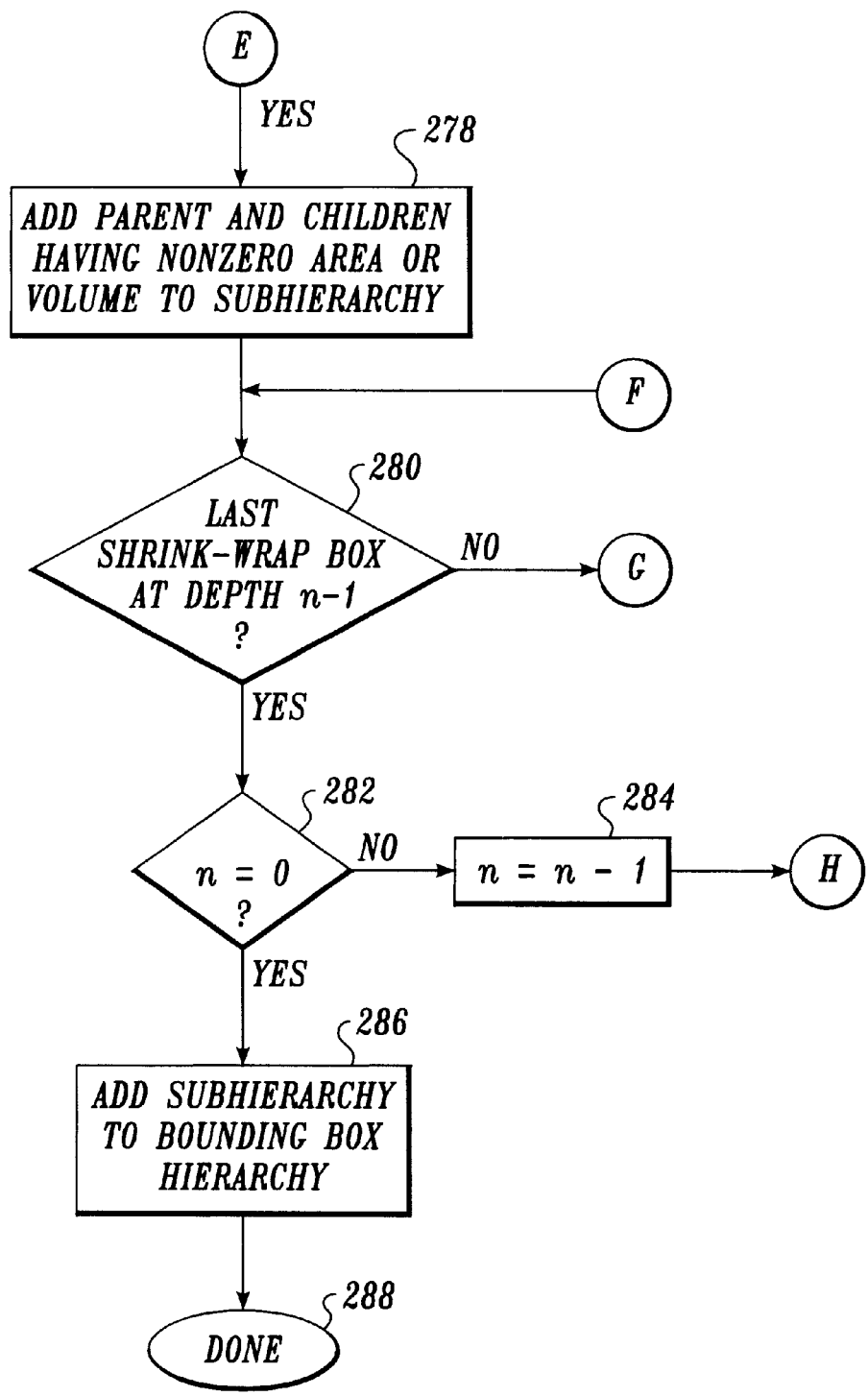

The logic begins in FIG. 12A at a block 250 and proceeds to a block 252 where n is once again set equal to the predetermined depth of the shrink-wrap box subhierarchy 46 for the object. In a block 254, the first shrink-wrap box at the next to the lowest level in the subhierarchy 46, i.e., n−1, is obtained and is stored in memory as a parent. In a block 256, the children of the parent shrink-wrap box are obtained. As described above, the children of the first parent shrink-wrap box are the first eight shrink-wrap boxes at depth n. In block 258, the first of those children obtained in n block 256 is obtained. The logic then proceeds to a block 260 where it determines if the child has shrunk. It will be appreciated that this determination is made by comparing the base and extent of the child shrink-wrap box with the base and extent of the original subdivision from which the shrink-wrap box was created. If the child shrink-wrap box has shrunk, it may be necessary to add the child, its siblings and the parent to the shrink-wrap subhierarchy 46 or the object that will be added to the bounding box hierarchy 38. Consequently, the logic proceeds from decision block 260 to a decision block 266 where it determines if the child has already been added to the subhierarchy 46.

On the other hand, if the child has not shrunk, it may not be necessary to add the child or any of its siblings to the shrink-wrap box subhierarchy 46. In this case, the logic proceeds from decision block 260 to a decision block 262 where it determines if the last child of the parent has been processed. If the result is negative, the next child of the parent is obtained in a block 264. The logic then returns to decision block 260 where it is determined once if the next child has shrunk. It will be appreciated that blocks 260–264 will be repeated until a child has been found that has shrunk from its original size or until the last child of the parent shrink-wrap box has been processed. If the latter is true, none of the children of the parent shrink-wrap box have shrunk, therefore it is not necessary to add the children of the parent to the shrink-wrap box subhierarchy 46. Accordingly, the logic proceeds from decision block 262 directly to a decision block 280 in FIG. 12B. In decision block 280, the logic determines if the last shrink-wrap box at depth n−1 of the subhierarchy 46 has been processed. If the result is negative, the logic proceeds to a block 281 where the next shrink-wrap box at depth n−1 is obtained and stored in memory as a parent shrink-wrap box. The logic then returns to block 256 where the children of the parent shrink-wrap box are obtained.

Returning to decision block 260, if one of the children of the parent shrink-wrap box has shrunk, the logic will proceed instead to a decision block 266 where it determines if the child has already been added to the shrink-wrap box subhierarchy 46. If not, it is necessary to determine if the child of any or its siblings must be added to the shrink-wrap subhierarchy 46 for the object. It will not be necessary to add the child or its siblings if the parent sufficiently approximates the surface of the object contained by it. However, if the parent does not, it will be necessary to add both the parent and its children to the shrink-wrap subhierarchy 46 for the object.

In this regard, the logic proceeds from decision block 266 to a decision block 268 where it determines if the parent shrink-wrap box is two-dimensional. If so, all of the children of the parent shrink-wrap box are necessarily two-dimensional shrink-wrap boxes as well. Further, the total area of the two-dimensional parent box can be approximated as the sum of the areas of each two-dimensional child of the parent shrink-wrap box. The total area of the parent shrink-wrap box is thus calculated in such a manner in block 274. In a decision block 276, the logic determines if the approximated total area calculated in block 274 divided by the actual area of the parent shrink-wrap box calculated using its base and extent is less than a predetermined ratio. In the preferred embodiment of the present invention, a predetermined ratio of 0.8 or 80% is used. However, those of ordinary skill in the art will recognize that a smaller or greater predetermined ratio can be used depending on how tight an approximation of the surface of the object is desired. If so, the parent shrink-wrap box is a sufficient approximation of the surface of the object that falls within it and it is not necessary to add the children of the parent shrink-wrap box to the subhierarchy 46. Accordingly, the logic proceeds from decision block 276 to decision block 280 where the logic determines if the last shrink-wrap box at depth n−1 has been processed. If the result of decision block 280 is negative, the next shrink-wrap box at that depth n−1 will be obtained in block 281. It must be noted that although the parent shrink-wrap box may be determined in block 276 to sufficiently approximate the surface of the object contained by it, it is not necessary to add the parent to the shrink-wrap subhierarchy 46 immediately. Rather, the parent will be added to the shrink-wrap subhierarchy 46 for the object as the child of another shrink-wrap box that does not sufficiently approximate the surface of the object contained by it. Further, it will be appreciated that if the parent shrink-wrap box has a zero volume, i.e., the parent shrink-wrap box does not intersect the object, neither the parent shrink-wrap box nor the children of the parent shrink-wrap box will be added to the shrink-wrap box subhierarchy 46.

Returning to decision block 276, if the result is positive, the parent shrink-wrap box is of sufficient size. Therefore, the logic proceeds from block 276 to a block 278 in FIG. 12B. In block 278, the parent shrink-wrap box and all of its children having a non-zero area or a non-zero volume are added to the shrink-wrap subhierarchy 46 for the object. It will be appreciated, that during the first iteration of block 178, a subhierarchy 46 will be created in memory with the parent shrink-wrap box added as the root and the children of the parent shrink-wrap hierarchy are added as leaves. After subsequent iterations of block 278, additional shrink-wrap boxes will be added to the subhierarchy 46 as siblings to the initial parent, or perhaps, grandparents or great grandparents. However, the addition of children to a hierarchy structure is well-known to those of ordinary skill in the art and thus, will not be discussed herein in any greater detail.

Once the parent and its children having a non-zero area or non-zero volume are added to the shrink-wrap box subhierarchy 46 for the object in block 278, the logic proceeds to decision block 280 where it determines if the last shrink-wrap box at depth n−1 has been processed. Described above, the result of decision block 280 is negative, the next shrink-wrap box at depth n−1 will be obtained and stored in memory as a parent in block 281. Blocks 256–281 would then be repeated for each shrink-wrap box at depth n−1 of the subhierarchy. In other words, blocks 256–281 will be repeated for each shrink-wrap box stored in the allocated array in memory corresponding to depth n−1.

If the result of decision block 280 is positive, then the last shrink-wrap box at depth n−1 has been processed and it is necessary to move up a level in the shrink-wrap box subhierarchy 46. Accordingly, the logic proceeds to a block 282 where it determines if the highest level in the subhierarchy 46 has been processed, i.e., if n=0. If the result is negative, the value for n is decremented in a block 284 and the logic returns to block 254. Blocks 254–284 are then repeated for each level of the subhierarchy 46, i.e., blocks 254–284 are repeated for the shrink-wrap boxes stored in each array allocated in memory. The shrink-wrap boxes at the highest level of the subhierarchy 46, i.e., n=0, have been processed, the logic ultimately proceeds to a block 286 and the subhierarchy created for those shrink-wrap boxes is added to the bounding box hierarchy 38 that the bounding box for the object is the root of the shrink-wrap box subhierarchy. The logic then ends in block 288.

Returning to FIG. 9, once the shrink-wrap boxes created in blocks 172 and 174 have been added to a shrink-wrap subhierarchy 46 for the object and the shrink-wrap subhierarchy 46 has been added to the bounding box hierarchy 38 in block 176, the logic proceeds to a decision block 178 where the logic determines if the last object in the bounding box hierarchy 38 has been processed. If not, the next object in the bounding box hierarchy 38 is obtained in a block 180, and blocks 162–180 are repeated until a subhierarchy 46 for the last object of the bounding box hierarchy 38 has been added to the bounding box hierarchy. When that occurs, it will be appreciated that the overall object hierarchy has been completed and the logic proceeds from decision block 178 to a block 182 where the logic ends.

Figure 13:
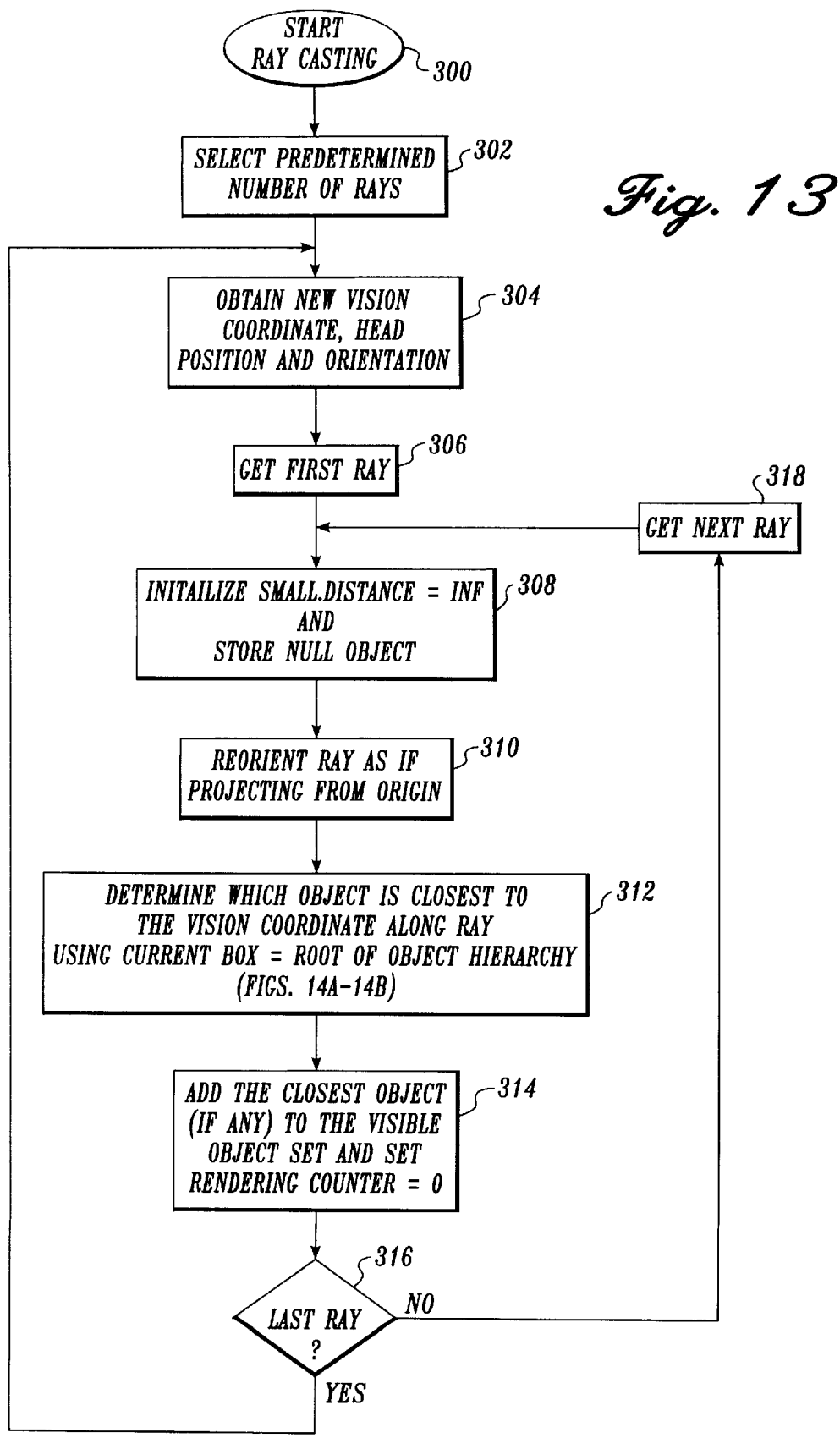
FIG. 13 is a flow diagram illustrating the logic used to cast rays from a particular viewpoint toward the objects comprising the complex structure in order to determine which objects are visible to the observer.

Returning to FIG. 1, once the object hierarchy comprising the bounding box hierarchy 38 and each of the shrink-wrap subhierarchies 46 has been built in block 24 and stored in the database 26, ray casting can begin. As shown in FIG. 1, the ray casting process 28 is performed in parallel by five different ray casting processors 128. The ray casting process 28 performed by each of the ray casting processors 128 is depicted in FIG. 13. As will be described in more detail below, the ray casting process 28 locates those objects in scene 52 that are visible to an observer from a particular viewpoint. However, the ray casting process of the present invention does not accomplish this by first assuming that all objects within the observer's viewing spectrum are visible, and then culling out those objects from the scene that are occluded, as taught by the prior art. Rather, the ray casting process of the present invention first assumes that none of the objects of the scene are visible to the observer, and then adds those objects to the scene that are closest to the current viewpoint along a casted ray because the closest objects must necessarily be visible. Hence, the ray casting process of the present invention can be referred to as an "unculling" process rather than a "culling" process.

The ray casting logic begins in FIG. 13 in a block 300 and proceeds to a block 302 where a predetermined number of rays to be casted is selected. In the preferred embodiment of the present invention, approximately one thousand rays are cast. However, those of ordinary skill in the art will appreciate that the number of rays to be cast can be increased or decreased depending on the level of detail desired in the resultant image. In a block 304 a new vision coordinate is obtained from the database 32 of vision coordinates. Each vision coordinate represents a particular head position and orientation for the observer in model space. In a block 306 a first ray to be casted is obtained. In block 308, a variable representing the smallest distance between a given object and the origin of the given ray is initialized equal to infinity. In addition, a null object is stored in memory.

The logic proceeds from block 308 to a block 310 where the ray is reoriented as if it is projecting from the origin of an x, y, z coordinate axis. In a block 312, the logic determines which object in the object hierarchy is closest to the given vision coordinate along the reoriented ray, i.e., which object along the reoriented ray is visible to the observer. This is accomplished by checking each ray against the root 40 of the object hierarchy. If the ray intersects the root 40, then it is likely that the ray intersects one or more children, grandchildren, etc. of the root. Consequently, the ray is checked against the root's children, grandchildren, etc. until the closest object to the origin of the ray is found.

Figure 14A:
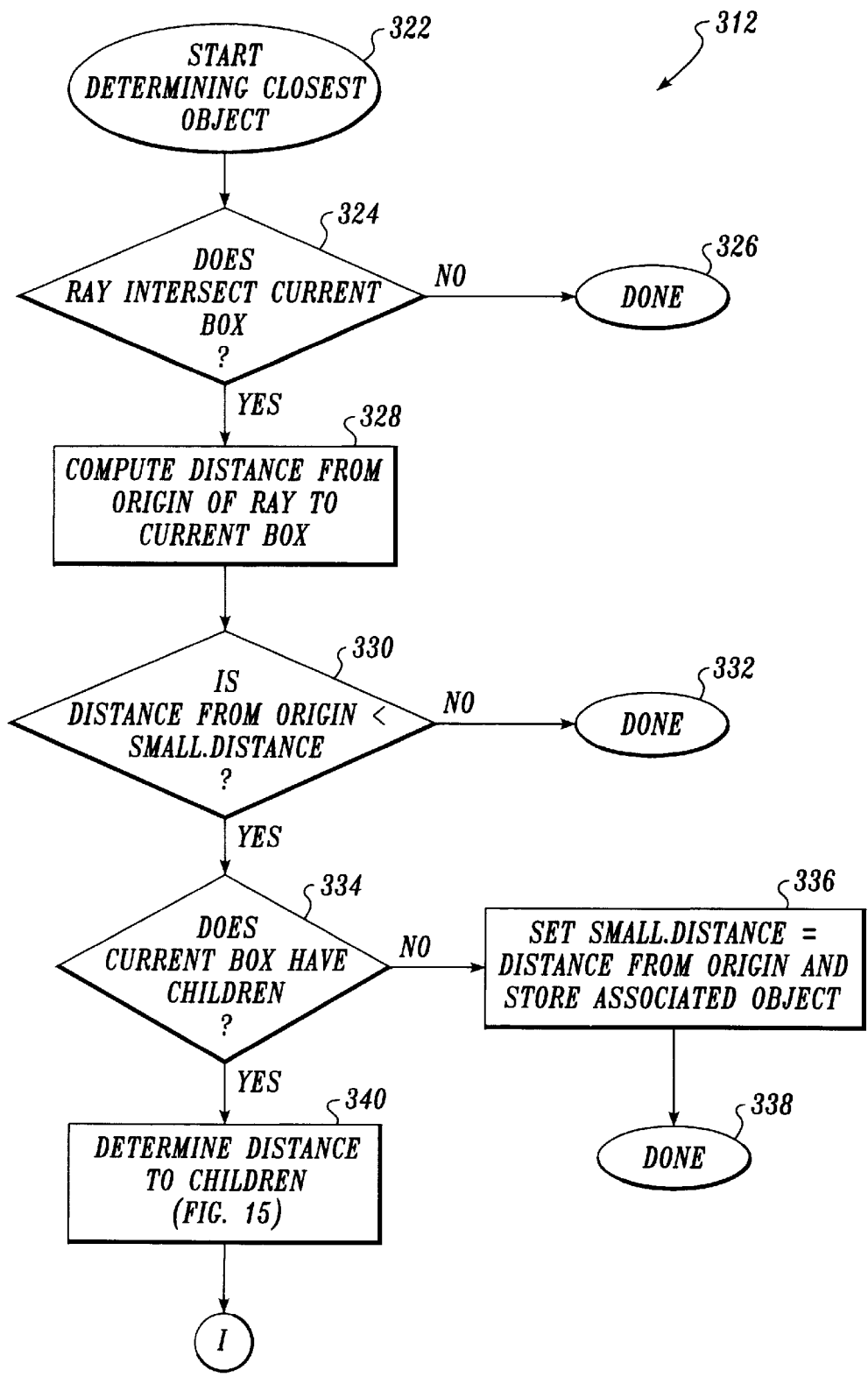
FIGS. 14A–14B are flow diagrams illustrating the logic used to determine which object intersected by a ray is closest to the origin of that ray.
Figure 14B:
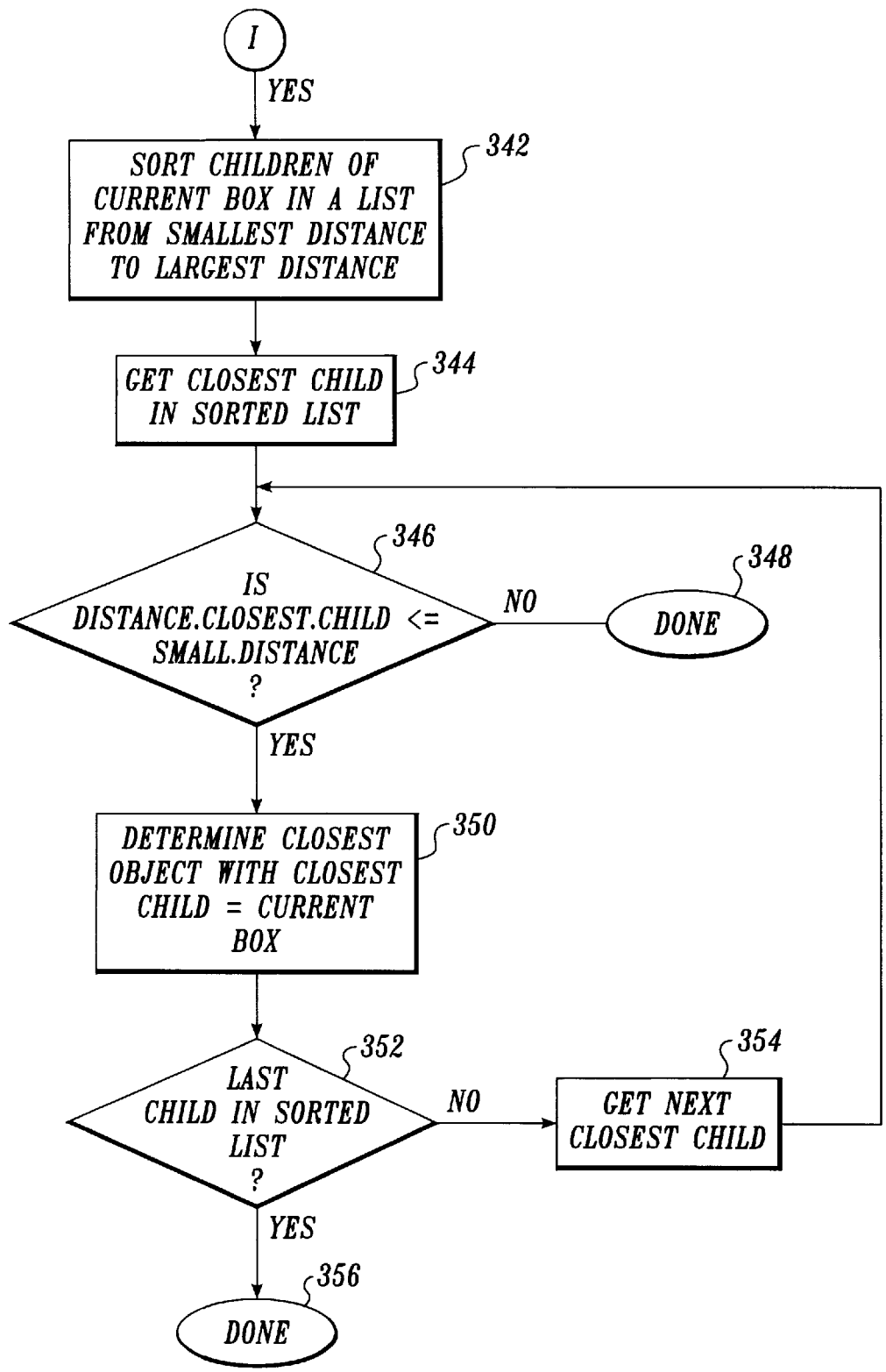

The logic used to determine which object is closest along this ray is shown in more detail in FIGS. 14A and 14B. The logic in FIG. 14A begins in a block 322 and proceeds to a decision block 324. In decision block 324, the logic determines if the reoriented ray intersects the current box. If not, the logic merely ends in a block 326. Those of ordinary skill in the art will recognize that during the first pass of the present routine, the current box is actually the root 40 of the object hierarchy. Therefore, if the ray does not intersect the current box, the ray actually does not intersect any object contained in the scene 52 and the logic ends in block 326. On the other hand, if the ray intersects the current box, the ray may intersect at least one object in the scene 52. Therefore, the rest of the object hierarchy must be searched to locate the closest object if it exists.

In this regard, the logic proceeds from decision block 324 to a block 328 where the distance from the origin of the ray to the current box is computed. It will be appreciated that the distance from the origin to the child of the current box is merely the distance between the origin of the ray and the point on the object (or portion thereof) bound by the current box that the ray intersects. In a decision block 330, the logic determines if the distance from the origin of the ray to the current box, i.e., leaf, is less than the smallest distance previously stored. It will be recognized that the smallest distance may be equal to infinity (if the current box is the first leaf of the object hierarchy to be processed), or it may be equal to the distance from the origin to another leaf in the object hierarchy. If the distance from the origin to the current box is less than the smallest distance, the logic proceeds to a decision block 334 in which the logic determines if the current box has any children. If so, the logic proceeds to a series of blocks 340–356 that ultimately search the object hierarchy for leaves, i.e., shrink-wrap boxes, that are intersected by the casted ray and calculate the distance between the origin of the casted ray and those leaves. It will be recognized that each time such a leaf is reached, the result of decision block 334 will be positive, i.e., the current box will not have any children. Hence, the logic will proceed to a block 336 where the smallest distance variable is set equal to the distance from the origin of the ray to the current box, and the object associated with the current box (i.e., the object which is contained by that box or which intersects that box) is temporarily stored in memory as the closest object to the origin of the casted ray. The logic then ends in block 338. Returning to decision block 330, if the distance to the current box is not less than the smallest distance, the object associated with the current box is not closer to the origin of the casted ray than the previously stored object. Therefore, the object associated with the current box is not stored in memory and the logic merely ends in a block 332. It will be appreciated from the foregoing that by the time each intersected leaf of the subhierarchy 46 is examined, the leaf having the smallest distance to the origin will have been located and its associated object stored in memory as the closest object to the origin of the casted ray.

Figure 15:
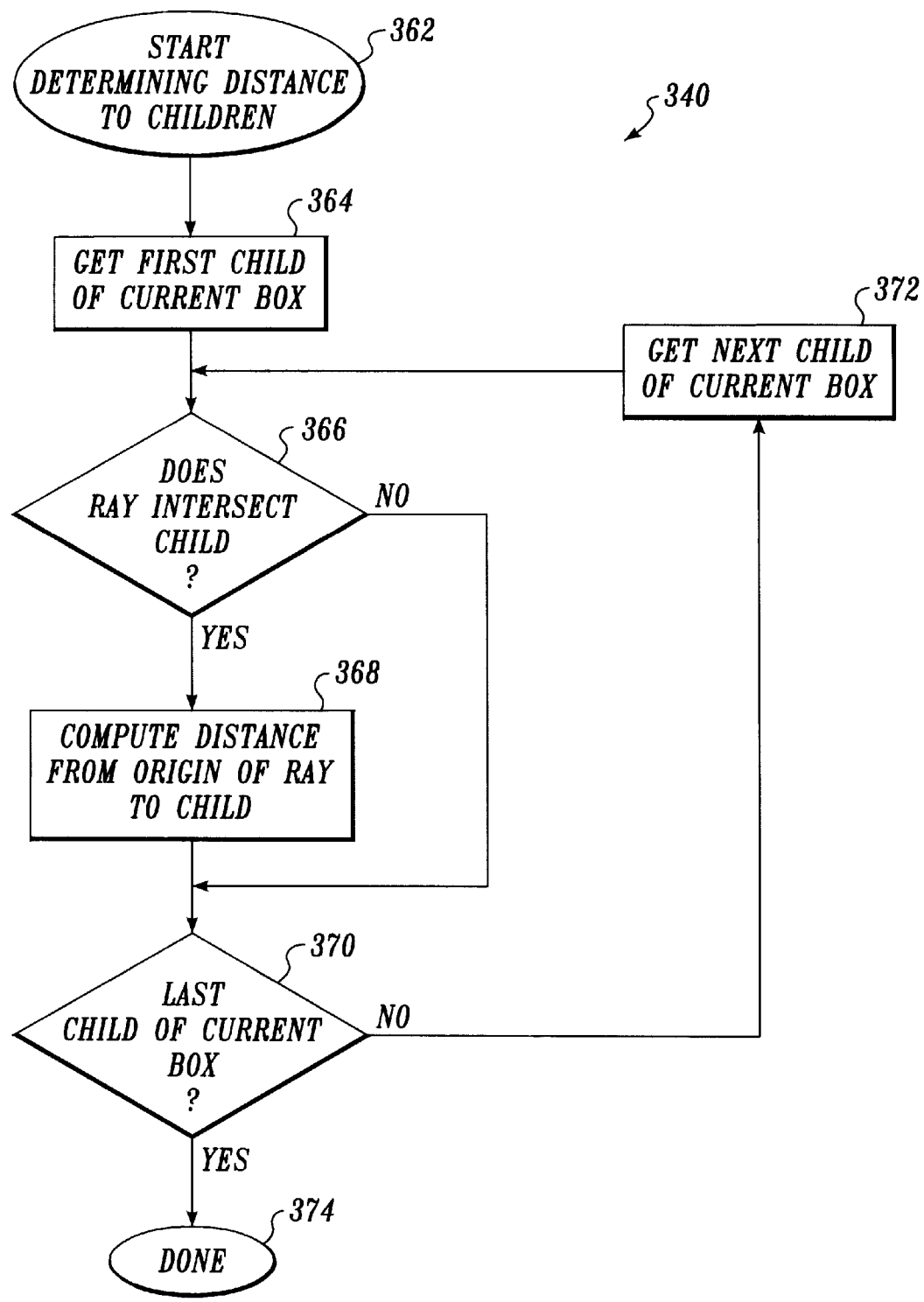
FIG. 15 is a flow diagram illustrating the logic used to determine the distance between the origin of a ray and a particular object.

Returning to decision block 334, if the current box does have children, it is necessary to continue examining the descendants of the current box. In this regard, the logic proceeds to block 340 where it calls a routine that determines the distance from the origin of the casted ray to each of the children of the current box. The logic for determining the distance between the origin of the ray and each of the children of the current box is more clearly depicted in FIG. 15. The logic begins in a block 362 and proceeds to a block 364 where the first child of the current box is obtained. In a decision block 366, the logic determines if the ray intersects the child of the current box. If so, the distance from the origin of the ray to the child of the current box is computed in a block 368. The logic then proceeds to a block 370 where it determines if the last child of the current box has been processed. If the result of decision block 366 is negative, the ray does not intersect the child of the current box. Therefore, the logic skips block 368 and proceeds directly to block 370.

If the last child of the current box has not been processed, the logic proceeds to a block 372 and blocks 366–372 are repeated until the last child of the current box has been processed and a distance between each child and the origin of the ray determined. When this occurs, the logic proceeds from decision block 370 and ends in a block 374. It will be recognized by those of ordinary skill in the art that the result of this routine is to compute a distance from the origin of the ray to each child intersected by that ray.

Returning to FIG. 14B, after the distance between the origin of the ray and each child of the current box is computed in block 340, the logic proceeds to a block 342 where the children of the current box that are intersected by the casted ray are sorted by distance from the origin of the ray in a list from smallest distance to largest distance. In a block 344, the closest child to the origin, i.e., the child of the current box having the smallest distance to the origin of the ray, is obtained. In a decision block 346 the logic determines if the distance to the closest child is less than or equal to the smallest distance to a leaf of the subhierarchy 46 previously stored. If the result of decision block 346 is negative, there are no other descendants of the closest child that are any closer to the origin of the ray than the previously located closest leaf. Hence, the logic ends a block 348.

On the other hand, if the distance to the closest child is less than or equal to the smallest distance previously stored, the closest child may have descendants intersected by the casted ray that are closer to the origin than the previously located closest leaf, or the closest child may itself be the closest leaf yet located in the subhierarchy 46. Accordingly, a recursive call to the present routine is made in block 350 with the closest child acting as the current box. As discussed above, if the closest child is a leaf shrink-wrap box intersected by the casted ray with a distance from the origin of the casted ray that is smaller than the distance of any previous such leaves, the smallest distance variable will be set equal to the distance to the closest child and the object associated with the closest child will be stored in memory in block 336. On the other hand, if the closest child has children, another recursive call to the present routine will ultimately be made in block 350 using the closest children of the closest child.

It will be appreciated that when the recursive call made in block 350 of FIG. 14B is complete, and the logic has been executed in any of the ways discussed above, all of the descendants of the closest child will have been examined and the closest object associated with any of the shrink-wrap boxes that are descendants of the closest child will have been stored in memory. Accordingly, the logic will proceed from block 350 to a decision block 352 where it determines if the last child in the sorted list has been processed. If not, the logic proceeds to a block 354 and the next closest child in the sorted list is obtained. Consequently, blocks 346–354 are repeated for the next closest child in the stored list such that the closest object associated with any of the shrink-wrap boxes that are descendants of the closest child or the next closest child will have been stored in memory. Ultimately, blocks 346–354 are repeated for each child in the sorted list such that the closest object associated with any of the shrink-wrap boxes of the object hierarchy, i.e., the object intersected by the ray that is closest to the given vision coordinate, is stored in memory. It will be appreciated, however, that it is possible that the casted ray does not intersect any objects in the scene 52. If so, the null object will be stored in memory.

When the routine depicted in FIGS. 14A and 14B is finally completed, the ray casting logic in FIG. 13 proceeds from block 312 to a block 314 where the closest object (if any) is added to the set of visible objects stored in shared memory in database 30. In addition, a rendering counter for the object is initialized to zero. As will be described below, the rendering counter keeps track of how many times an object in the visible object set is passed over by the object rendering process 34. In a decision block 316, the logic determines if the last ray has been processed. If not, the next ray to be cast is obtained in block 318. Blocks 308–318 are then repeated for each ray to be cast. Accordingly, for each ray cast from the given vision coordinate, the closest object to the given vision coordinate that is intersected by the ray is added to the set of visible objects stored in database 30 located in shared memory.

Returning to FIG. 1, it will be appreciated that the logic depicted in FIG. 13 is performed in parallel by each of the ray casting processors 128. Although, in the preferred embodiment of the present invention, each of the ray casting processors 128 simultaneously casts rays from the same vision coordinate, the rays are cast into a different region of model space. For example, if model space is considered to be the display screen, the display screen may be divided into five separate regions, with each ray casting processor 128 casting rays into one of the regions. Thus, as each ray casting processor 128 performs the logic depicted, each ray casting processor 128 adds slightly different objects to the set of visible objects stored in database 30. Consequently, a comprehensive set of visible objects is rapidly built. In the preferred embodiment of the present invention, an object is added to the visible object set by the group of ray casting processors 128 approximately once every second. As visible objects are added by the five ray casting processors 128, the two object rendering processors 134 read visible objects from the shared database 30 and render all of the visible objects comprising the scene 52 on the display 36 at every 0.05 sec. The object rendering processors are allowed to draw visible objects at a rate faster than they are added to the visible object set because the ray casting processes 28 have been decoupled from the object rendering processes 34 and are allowed to run asynchronously on separate processors from those that run the object rendering process 34.

Figure 16:
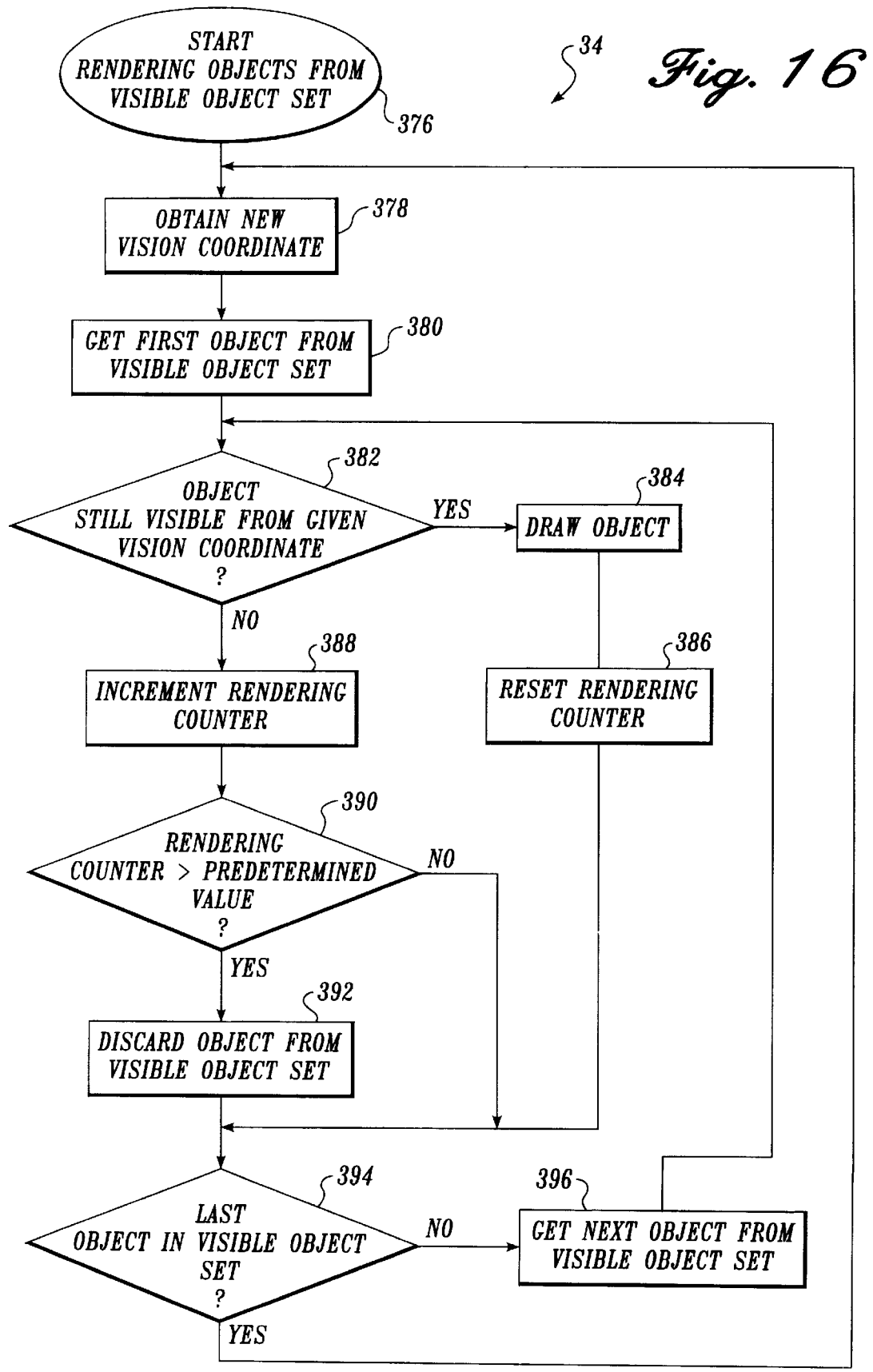
FIG. 16 is a flow diagram illustrating the logic used to draw visible objects on a display.

The logic implemented by each object rendering processor 134 to render objects from the visible object set stored in database 30 on a display 36 is shown in more detail in FIG. 16. The logic begins in a block 376 and proceeds to a block 378 where a new vision coordinate is obtained. It will be appreciated that the new vision coordinate obtained from the database 30 may be different than the vision coordinate most recently used by the ray casting processes 28 to determine which objects were visible to the observer. However, the assumption is made in the present invention that the observer generally changes his/her current viewpoint slowly. Therefore, even if the vision coordinate obtained in block 378 is different than that shared by the ray casting processes 28, the set of visible objects will essentially be the same.

In a block 380, the first object from the visible object set is obtained from the database 30. As noted above, the database 30 containing the set of visible objects resides in memory shared by both the ray casting processors 128 and the object rendering processors 134. Consequently, the object rendering processors 134 read objects from the visible object set stored in share memory while the ray casting processors 128 add objects to the visible object set. However, it is not necessary that objects be added to the visible object set at the same rate they are read from the visible object set. Rather, it is only necessary that objects be added to the visible object set continuously.

After the object is obtained from the visible object set, the logic determines in a decision block 382 if the object is still visible from the given vision coordinate. It will be appreciated from the discussion above that the observer's current viewpoint may have changed such that the given object is outside the observer's viewing spectrum. If so, the logic proceeds from decision block 382 to a block 388 where the rendering counter, i.e., the rendering counter that keeps track of how many times the object is passed over and not drawn on the display 36, is incremented. The logic then proceeds to a decision block 390 where it determines if the rendering counter for the object is greater than a predetermined value. In the preferred embodiment of the present invention, if the object has been passed over more than four times, the object is discarded from the visible object set in block 392. However, if the rendering counter is not yet greater than four, the object is maintained in the set of visible objects. Accordingly, the logic skips block 392 and proceeds to a decision block 394 where it determines if the last object in the visible object set has been rendered on the display 36.

Returning to decision block 382, if the object is still visible to the observer from the new vision coordinate, the logic proceeds to a block 384 where the object is drawn on the display 36. The logic then proceeds to a block 386 where the rendering counter for the object is reset to its original value. It will be appreciated by those of ordinary skill in the art that the object is rendered or drawn on the display 36 using graphics routines well-known in the computer graphics art, such as Silicon Graphics' GL or OpenGL.

After the rendering counter has been reset in block 386, the logic then proceeds to decision block 394 where it determines if the last object in the visible object set has been rendered on the display 36. If not, the logic proceeds to a block 396 and the next object from the visible object set associated with the given vision coordinate is obtained from the database 30. Blocks 382–396 are then repeated for each object in the visible object set associated with the given vision coordinate. In other words, each object visible to the observer from the given vision coordinate is rendered on the display 36. Since the object rendering process 34 depicted in FIG. 16 is being run by two object rendering processors 134 in parallel, it will be appreciated that the same object is simultaneously displayed on each of the displays 36. The only difference is that the object is being rendered on one display 36 from the current position of the observer's head and right eye, while the object is being rendered on the other display 36 from the current position of the observer's head and left eye. Thus, a balanced, three-dimensional stereovision image is delivered to the observer.

When the last object in the visible object set has been rendered, the logic exits decision block 394 and returns to block 378. Blocks 378–396 are then repeated for each successive vision coordinate obtained from the vision coordinate database 32. In the preferred embodiment of the present invention, it will be appreciated that the object rendering process 34 described above draws all of the objects in the scene 52 every 0.05 seconds. However, those of ordinary skill in the art will recognize that the speed at which objects are drawn depend on the number of objects in the scene, the complexity of the objects, and the speed of the processes. Although this is significantly faster than the rate at which the ray casting processes 28 add objects to the visible object set, the difference in rates is immaterial as long as the object rendering processes 34 and ray casting processes 28 remain discrete processes and as long as objects are continuously added to the set of visible objects.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for generating on a display a graphical image of a complex structure represented by a plurality of objects, the method comprising:
   (a) projecting a plurality of rays from a given vision coordinate, and for each projected ray,
      (i) determining which objects in the plurality of objects are intersected by the ray;
      (ii) determining which object, among the objects intersected by the ray, is closest to the given vision coordinate; and
      (iii) adding the closest object to a set of visible objects; and
   (b) as objects are added to the set of visible objects, for each object in the set of visible objects,
      (i) reading the object from the set of visible objects as objects are added to the set of visible objects;
      (ii) if the object is visible from the current vision coordinate, drawing the object on the display; and
      (iii) if the object is not visible from the current vision coordinate, discarding the object from the set of visible objects.

2. The method of claim 1, wherein determining which object among the objects intersected by the ray is the closest object to the given vision coordinate comprises:
   (a) determining a distance between each object intersected by the ray and the given vision coordinate; and
   (b) determining which object intersected by the ray has the smallest distance to the given vision coordinate.

3. The method of claim 2, further comprising organizing the plurality of objects into an object hierarchy, from a root volume bounding the complex structure, to a plurality of subvolumes wherein each subvolume bounds each of the plurality of objects, to a plurality of shrunken subvolumes wherein each shrunken subvolume bounds a portion of each object.

4. The method of claim 3, wherein determining the distance between each object intersected by the ray and the given vision coordinate comprises:
   (a) searching the object hierarchy to determine with which shrunken subvolumes the ray intersects; and
   (b) for each shrunken subvolume with which the ray intersects,
      (i) determining a distance between the shrunken subvolume and the given vision coordinate; and
      (ii) determining which shrunken subvolume has the smallest distance to the given vision coordinate.

5. The method of claim 1, wherein (a) and (b) are repeated for successive vision coordinates.

6. The method of claim 1, wherein a computer readable medium is encoded to perform (a) and (b).

7. The method of claim 1, wherein (a) is performed in parallel by a plurality of ray casting processors, while (b) is performed in parallel by a plurality of separate object rendering processors such that objects are concurrently added to the set of visible objects by each of the plurality of ray casting processors while objects are asynchronously rendered on a set of displays by each of the object rendering processors.

8. An image rendering system for rendering a graphical image of a complex structure on a display, wherein the complex structure is represented by a plurality of objects, the image rendering system comprising:
   (a) a storage medium for storing the plurality of objects organized into an object hierarchy and for storing a set of visible objects;

(b) at least one processing unit coupled to the storage medium for adding those objects in the object hierarchy that are visible from a given viewpoint to the set of visible objects stored in the storage medium and for discarding those objects in the object hierarchy that are not visible from the given viewpoint; and (c) at least one processing unit coupled to the storage medium for rendering each visible object in the set of visible objects on the display in accordance with a current viewpoint while the other at least one processing unit is adding visible objects to the set of visible objects.

9. The image rendering system of claim 8, wherein the at least one processing unit for adding visible objects to the set of visible objects, adds visible objects to the set of visible objects by:

(a) projecting a plurality of rays from the given viewpoint; and (b) for each projected ray,
  (i) determining with which objects in the object hierarchy the ray intersects;
  (ii) determining which object, among the objects with which the ray intersects, is closest to the given viewpoint; and
  (iii) adding the closest object to a set of visible objects while another visible object is being rendered by the processing unit for rendering each visible object.

10. The image rendering system of claim 9, wherein the at least one processing unit determines which object among the objects with which the ray intersects is the closest object to the given vision coordinate by:

(a) determining a distance between each object intersected by the ray and the given viewpoint; and (b) determining which object intersected by the ray has the smallest distance to the given viewpoint.

11. The image rendering system of claim 10, wherein the at least one processing unit for rendering each visible object in the set of visible objects, renders each visible object by:

(a) reading the object from the set of visible objects as objects are added to the set of visible objects by the other at least one processing unit; and (b) if the object is visible from the current viewpoint, drawing the object on the display.

12. The image rendering system of claim 8, wherein a plurality of processing units are coupled to the storage medium for adding those objects in the object hierarchy that are visible from a given viewpoint to the set of visible objects stored in the storage medium.

13. The image rendering system of claim 12, wherein a plurality of processing units are coupled to the storage medium for rendering each visible object in the set visible objects in accordance with a current viewpoint, while the other processing units are adding visible objects to the set of visible objects.

14. The image rendering system of claim 13, wherein each of the plurality of processing units for rendering each visible object in the set of visible objects renders each visible object on a separate display.

15. A method for generating a graphical image of a complex structure on a set of displays, wherein the complex structure is represented by a plurality of objects, the method comprising:

(a) implementing a ray casting routine that (i) casts a plurality of rays from a given vision coordinate; and (ii) for each casted ray, adds the object intersected by the casted ray that is the closest to the given vision coordinate to a set of visible objects; and (b) implementing an object rendering routine that renders each object in the set of visible objects on a display in accordance with a current vision coordinate, as objects are added to the set of visible objects, and that further discards any object from the set of visible objects if the object is determined to no longer be visible from the current vision coordinate.

16. The method of claim 15, wherein a plurality of ray casting routines are implemented in parallel such that each ray casting routines adds objects to the set of visible objects.

17. The method of claim 16, wherein a plurality of object rendering routines are implemented in parallel such that each object rendering routine renders each object in the set of visible objects on a display in accordance with the current vision coordinate while each ray casting routine adds objects to the set of visible objects.

18. The method of claim 17, wherein each ray casting routine adds objects to the set of visible objects by:

for each ray cast by the ray casting routine,
  (a) determining which objects are intersected by the casted ray;
  (b) determining which object, among the objects intersected by the casted ray, is closest to the given viewpoint; and
  (c) adding the closest object to the set of visible objects.

19. The method of claim 18, wherein each ray casting routine determines which object among the objects with which the ray intersects is the closest object to the given vision coordinate by:

(a) determining a distance between each object intersected by the casted ray and the given vision coordinate; and (b) determining which object intersected by the casted ray has the smallest distance to the given vision coordinate.

20. The method of claim 19, wherein each object rendering routine renders each visible object in the set visible objects by:

(a) reading the object from the set of visible objects as objects are added to the set of visible objects by each of the ray casting routines; and (b) if the object is visible from the current viewpoint, drawing the object on the display.

21. The method of claim 18, wherein the plurality of objects representing the complex structure are organized into an object hierarchy from a root volume bounding the complex structure, to subvolumes bounding each of the plurality of objects, to shrunken subvolumes bounding portions of each object.

22. The method of claim 21, wherein each ray casting routine determines which object is closest to the given vision coordinate by:

(a) searching the object hierarchy to locate shrunken subvolumes that are intersected by the casted ray; and (b) for each shrunken subvolume intersected by the ray, determining which shrunken subvolume has the smallest distance to the given vision coordinate; and (c) storing the object associated with the shrunken subvolume in the set of visible objects.

* * * * *

UNITED STATES PATENT AND TRADEMARK OFFICE
CERTIFICATE OF CORRECTION

PATENT NO. : 6,023,279
DATED : February 8, 2000
INVENTOR(S) : H.A. Sowizral et al.

It is certified that error appears in the above-identified patent and that said Letters Patent is hereby corrected as shown below:

| COLUMN | LINE | |
|---|---|---|
| [57]<br>Pg. 1, col. 2 | Abstract<br>7 of text | after "determines" delete "with" |
| 22<br>(Claim 16, | 14<br>line 3) | "routines" should read --routine-- |
| 22<br>(Claim 20, | 41<br>line 2) | "set visible" should read --set of visible-- |

Signed and Sealed this

Fifteenth Day of May, 2001

*Attest:*

NICHOLAS P. GODICI

*Attesting Officer*   Acting Director of the United States Patent and Trademark Office